United States Patent
Mansour et al.

(10) Patent No.: US 11,948,229 B2
(45) Date of Patent: Apr. 2, 2024

(54) METHOD FOR TOMOGRAPHIC IMAGING OF OBJECT REFLECTIVITY UNDER INHOMOGENEOUS BACKGROUND MEDIA

(71) Applicant: Mitsubishi Electric Research Laboratories, Inc., Cambridge, MA (US)

(72) Inventors: Hassan Mansour, Boston, MA (US); Yanting Ma, Allston, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 240 days.

(21) Appl. No.: 17/651,427

(22) Filed: Feb. 17, 2022

(65) Prior Publication Data
US 2023/0260170 A1 Aug. 17, 2023

(51) Int. Cl.
*G06T 11/00* (2006.01)
*G01B 9/02* (2022.01)
(Continued)

(52) U.S. Cl.
CPC ........ *G06T 11/005* (2013.01); *G01B 9/02091* (2013.01); *G01N 29/0672* (2013.01); *G01V 1/34* (2013.01)

(58) Field of Classification Search
CPC . G01V 1/34; G01V 1/28; G01V 1/345; G01V 1/32; G01V 1/30; G01V 1/306;
(Continued)

(56) References Cited

U.S. PATENT DOCUMENTS

| | | | |
|---|---|---|---|
| 6,005,916 A * | 12/1999 | Johnson | G06T 11/006 600/425 |
| 2007/0282200 A1* | 12/2007 | Johnson | G01N 22/00 600/407 |

(Continued)

OTHER PUBLICATIONS

Koponen et al. Bayesian approximation error approach in full-wave ultrasound tomography) (Year: 2014).*

*Primary Examiner* — Daniel L Murphy
*Assistant Examiner* — Amie M Ndure
(74) *Attorney, Agent, or Firm* — Gene Vinokur

(57) ABSTRACT

Embodiment of the present disclosure disclose a tomographic imaging system for reconstructing an image of an internal structure of an object. An incident wavefield is transmitted into the object occupying a background domain embedding the object. The incident wavefield is scattered into multiple scattered wavefield by the object. The incident and scattered wavefields are measured as a total wavefield. The total wavefield propagates through a computational domain and a residual domain in the background domain that are defined by cross-domain and residual measurement operators. The total wavefield is used for the image reconstruction. The image is reconstructed by solving an optimization problem corresponding to the computational domain. The optimization problem is solved iteratively to minimize a difference between the total wavefield and a wavefield synthesized using a measurement operator and a Green's function operator from the reconstructed image. The reconstructed image is outputted via an output interface.

20 Claims, 12 Drawing Sheets

(51) Int. Cl.
*G01B 9/02091* (2022.01)
*G01N 29/06* (2006.01)
*G01V 1/34* (2006.01)

(58) Field of Classification Search
CPC .... G01V 1/307; G01V 1/308; G01V 2210/10; G01V 2210/20; G01V 2210/40; G01V 2210/41; G01V 2210/42; G01V 2210/43; G01V 2210/46; G01V 2210/48; G01V 2210/47; G01V 2210/45; G01V 2210/44; G01B 9/02091; G01B 9/0209; G01B 9/02; G01B 15/00; G01B 17/00; G01N 29/0672; G01N 21/47; G01N 23/046; A61B 8/13; G06T 11/005; G06T 11/006
USPC .................................................. 367/7
See application file for complete search history.

(56) References Cited

U.S. PATENT DOCUMENTS

| | | | | |
|---|---|---|---|---|
| 2016/0025878 A1* | 1/2016 | Shin | ........... | G01V 1/282 367/7 |
| 2020/0271577 A1* | 8/2020 | Mansour | ........... | G06T 11/006 |
| 2021/0247333 A1* | 8/2021 | Ma | ........... | G01V 9/00 |

\* cited by examiner

METHOD FOR TOMOGRAPHIC IMAGING OF OBJECT REFLECTIVITY UNDER INHOMOGENEOUS BACKGROUND MEDIA

TECHNICAL FIELD

This disclosure relates to tomography, and more specifically to a tomographic imaging system for reconstructing an image of an internal structure of an object.

BACKGROUND

In tomographic imaging of objects, generating a high-resolution image of objects that are located within an inhomogeneous background material may be desirable for many applications. The applications may include microwave imaging, biomicroscopy, medical imaging, through-the-wall imaging (TWI), infrastructure monitoring, and seismic imaging. The image may correspond to an image of refractive indices of a material inside the object. Typically, in order to generate the image, a wavefield such as an electromagnetic (EM) wavefield, light or acoustic pulse may be transmitted to the object by a transmitter. The wavefield may be scattered by various structures inside the object and may further propagate to an array of antennas at a receiver. The scattered wavefield captured at the receiver may be used to generate the image that represents a visualization of a distribution of permittivity of the material of the object. The scattered wavefield contains information about spatial distribution corresponding to the permittivity of the object or a region of interest corresponding to the object. The permittivity provides a visualization of an internal structure of the object as well as a characterization of physical properties of the object.

For instance, in microwave imaging, the permittivity provides information about the structure and properties of objects. In biomicroscopy, the permittivity allows visualizing an internal cell structure in three-dimensions. In TWI, the permittivity allows learning about dielectric properties of a wall that may be used to compensate for delay of the signal propagating through the wall.

However, generating a high-resolution image of the object, especially from the inhomogeneous background material may be challenging. For instance, the inhomogeneous background material may cause multiple scattering of the wavefield. The multiple scattered wavefield may contain less information of the spatial distribution that may result into an inaccurate image of the object. In some cases, the array of antenna at the receiver may suffer from position ambiguity due to which the generation of the image may be inaccurate. In some cases, a computational domain corresponding to the object in the inhomogeneous background material may also impact in the reconstruction of the image. For instance, a large size computational domain for the image reconstruction may increase computational complexity, which may not be efficient and feasible.

Accordingly, there is a need for a technical solution to overcome the above-mentioned challenges. More specifically, there is need for reconstructing an image of internal structure of an object located within an inhomogeneous background material, in an efficient and feasible manner.

SUMMARY

In tomography, images may be influenced by spatially dependent absorption and scattering properties of a medium, especially an inhomogeneous background reflectivity medium. The inhomogeneous background reflectivity medium (referred to hereinafter as inhomogeneous background medium) may be embedded with an object. The object with an unknown internal structure may be visualized from a reconstructed image of the object. The reconstructed image may correspond to at least one of an image of refractive indices of material inside the object, and a distribution of permittivity of material inside the object.

In order to reconstruct the image, an incident wavefield, such as electromagnetic or acoustic waves of finite bandwidth, is transmitted to the inhomogeneous background medium embedded with the object. The incident wavefield may be in complex interaction with material properties of the object and the inhomogeneous background medium. When the incident wavefield of the electromagnetic or acoustic waves propagates inside the object and the inhomogeneous background medium, multiple scattering waves are induced on boundaries of material inside the object as well as by the inhomogeneous background medium. In particular, the multiple waves are scattered differently for different frequencies due to the material properties.

These scattered waves contain information about a spatial distribution of the material properties that may be used for reconstructing the image of the internal structure of the object. However, the multiple waves that are scattered differently for different frequencies due to the material properties may provide less spatial frequency information about the object. The less spatial frequency information may result in generating an inaccurate internal structure image of the object embedded in the inhomogeneous background medium. The multiple scattered waves for different frequencies also results in a cost function that is non-linear with multiple local minima, which increases complexity for the reconstruction of the image.

Various embodiments may be implemented for two acquisition modes in inverse scattering. The two acquisition modes include a transmission mode and a reflection mode. In the transmission mode, transmitters and receivers are located on opposite sides of a target object, such as the object embedded in the inhomogeneous background medium. In the reflection mode the transmitters and the receivers are located on the same side of the object. The reflection setup generally arises due to a limitation that allows accessing only one side of the material, as in the case of underground imaging. In some applications, the reflection setup may be effective. However, in the reflection tomography scenario, the inverse scattering problem may be an ill-posed problem as the measured reflections may contain far less spatial frequency information about the object. The less spatial frequency information may result in outputting an inaccurate reconstructed image of the object.

To that end, it is an object of some embodiments to reconstruct an image of an unknown internal structure of the object embedded in the inhomogeneous background medium. It is also an objective of some embodiments to reduce complexity for the reconstruction of the image. In some embodiments, the image may be reconstructed by formulating a scattering model that describes relation between the scattered wavefield and parameters of the inhomogeneous background medium. To that end, wave propagation integral equations are formulated to incorporate background knowledge, i.e., knowledge of the inhomogeneous background medium. The incorporation of the background knowledge may reduce the size of a reconstruction domain and thereby reduce computational complexity of the image reconstruction. The reconstruction domain for the image reconstruction is a computational domain occupied by the object in the inhomogeneous background medium. The computational domain resides within a background domain in the inhomogeneous background medium. Thus, the computational domain that is smaller than the background domain, reduces the computational complexity for the reconstruction of the image.

To that end, some embodiments are based on recognition that the image of the object may be reconstructed by solving an optimization problem that corresponds to the computational domain of the object. The computational domain is subjected to boundary conditions governed by operators. The operators include a cross-domain operator and a residual measurement operator that define a propagation of a total wavefield. The total wavefield is a combination of the incident wavefield and the scattered wavefield that are received as measurement at a receiver with an array of antennas).

The cross-domain operator defines a propagation of the total wavefield from the computational domain into a residual domain and from the residual domain back into the computational domain. The residual domain is a portion in a background domain of the inhomogeneous background medium located outside the computational domain. In particular, the cross-domain operator is a mapping function for the total wavefield in the computational domain from each grid point in the computational domain to each corresponding grid point in the residual domain.

The residual measurement operator defines a propagation of the total wavefield from the computational domain into the residual domain and back to the receiver. In particular, the residual measurement operator is a mapping function for the total wavefield in the computational domain from each grid point in the computational domain to each location of corresponding one or more antennas of the receiver.

In some embodiments, the wave propagation integral equations may be formulated by performing a series of integration operations. The series of integration operations include a first operation, a second operation and a third operation. The first operation performs an integral for each grid point in the residual domain with a Green's function centered at a grid point in the residual domain over each grid point in the computational domain. The second operation computes an updated total wavefield resulting from an interaction of the total wavefield in the residual domain with the background medium inside the residual domain. The third operation performs an integral for each grid point in the computational domain with a Green's function centered at a grid point in the computational domain over each grid point in the residual domain.

Some embodiments are based on the understanding that the measurement may be managed in presence of high reflective properties of the inhomogeneous background medium. To that end, the reformulated wave propagation integral equations incorporated with the background knowledge may be coupled with an incremental frequency inversion framework. The incremental frequency inversion framework may pose the image reconstruction as a sequence of constrained nonlinear least-squares subproblems.

The incremental frequency framework estimates a model of permittivity of the object. The estimation of the object's permittivity model by the incremental frequency framework precludes need for a model for the image of the object to be reconstructed. The model is updated in a sequential manner as higher frequency measurements are included in inversion of low frequency to high frequency of the measurement. In the inversion, a cost function for the low-frequency wavefield is used as a regularizer for the high-frequency wavefield. The sequential update of the model solves for solutions that are closer to a global minimizer.

In some embodiments, the optimization problem that corresponds to the computational domain of the object is converted to another optimization problem that has free space boundary conditions for the image reconstruction. The conversion of the optimization problem with the free space boundary conditions may include synthesizing a background wavefield at each grid point in the background domain and measurements of the background wavefield at the receiver, resulting from a propagation of the incident wavefield into the background domain and computing simultaneously a difference wavefield along with the unknown internal structure of the object by forming a difference partial differential equation (PDE) operator. The PDE operator discretizes a PDE that describes an interaction between the cross-domain operator, the residual measurement operator, the measurement operator, the Green's function operator, the incident wavefield, the background wavefield, the difference wavefield, and the unknown internal structure of the object.

The PDE operator may be inverted for a current image of the object using an inversion operation to determine a matrix, such as a Jacobian matrix of the scattered wavefield with respect to the current image of the object. The inversion operation may be performed using a preconditioned conjugate gradient method. The preconditioned conjugate gradient method computes a preconditioner of the PDE operator using a deep learning network. The deep learning network is trained to determine an estimate of the scattered wavefield from the incident wavefield for the reconstructed image.

The current image of the object is updated via an update operation that minimizes a cost function between the measurements of the total wavefield and a total wavefield synthesized by combining the Jacobian of the scattered wavefield and a quasi-Newton descent direction of the cost function with respect to the current image of the object. The cost function may include one or a combination of a Euclidean distance between the measurements of the total wavefield and the synthesized total wavefield, a one norm distance between the measurements of the total wavefield and the synthesized total wavefield and a summation of the Euclidean distance and a barrier function, which is a summation of an exponential function that penalizes the update of the current image of the object.

After the update of the current image, the current image of the object is projected onto a constrained total variation penalty function. The total variation penalty function regularizes the updated image so that the updated image remains consistent with lower frequency measurements.

Accordingly, one embodiment discloses a tomographic imaging system. The tomographic imaging system includes a transmitter configured to transmit an incident wavefield into an object embedded in an inhomogeneous reflectivity background medium with a known internal structure and occupying a background domain in the inhomogeneous reflectivity background medium. The tomographic imaging system includes a receiver configured to receive measurements of a total wavefield. The total wavefield is a combination of the incident wavefield and a wavefield scattered by an unknown internal structure of the object and the known internal structure of the background domain. The object occupies a computational domain that is smaller than the background domain and is located residing inside of the background domain of the inhomogeneous reflectivity background medium. The tomographic imaging system includes a memory configured to store a cross-domain operator and a residual measurement operator. The cross-domain operator defines a propagation of the total wavefield from the computational domain of the object having the unknown internal structure of the object into a residual domain and back into the computational domain. The residual domain occupies a portion of the background domain located outside the computational domain. The residual measurement operator defines a propagation of the total wavefield from the computational domain into the residual domain and back to the receiver. The tomographic imaging system includes a processor configured to reconstruct an image of the unknown internal structure of the object from the measurements by solving an optimization problem corresponding to the computational domain of the object subject to boundary conditions of the stored cross-domain and residual measurement operators. The optimization problem is solved iteratively to minimize a difference between the measurements of the total wavefield and a wavefield synthesized using a measurement operator and a Green's function operator from the reconstructed image. The tomographic imaging system further includes an output interface configured to render the reconstructed image.

Accordingly, another embodiment discloses a tomographic imaging method that uses a processor coupled with stored instructions implementing the method, wherein the instructions, when executed by the processor conduct steps of the method. The method includes transmitting an incident wavefield into an object embedded in an inhomogeneous reflectivity background medium with a known internal structure and occupying a background domain in the inhomogeneous reflectivity background medium. The method includes receiving measurements of a total wavefield. The total wavefield is a combination of the incident wavefield and a wavefield scattered by an unknown internal structure of the object and the known internal structure of the background domain. The object occupies a computational domain that is smaller than the background domain residing inside the background domain of the inhomogeneous reflectivity background medium. The method includes reconstructing an image of the unknown internal structure of the object from the measurements by solving an optimization problem corresponding to the computational domain of the object subject to boundary conditions of a cross-domain operator and a residual measurement operator. The cross-domain operator defines a propagation of the total wavefield from the computational domain of the object having the unknown internal structure of the object into a residual domain and back into the computational domain. The residual domain occupies a portion of the background domain located outside the computational domain. The residual measurement operator defines a propagation of the total wavefield from the computational domain into the residual domain and back to the receiver. The optimization problem is solved iteratively to minimize a difference between the measurements of the total wavefield and a wavefield synthesized using a measurement operator and a Green's function operator from the reconstructed image. The method further includes generating, via an output interface, the reconstructed image.

Accordingly, yet another embodiment discloses a non-transitory computer readable storage medium embodied thereon a program executable by a processor for performing a method. The method includes transmitting an incident wavefield into an object embedded in an inhomogeneous reflectivity background medium with a known internal structure and occupying a background domain in the inhomogeneous reflectivity background medium. The method includes receiving measurements of a total wavefield. The total wavefield is a combination of the incident wavefield and a wavefield scattered by an unknown internal structure of the object and the known internal structure of the background domain. The object occupies a computational domain that is smaller than the background domain residing inside the background domain of the inhomogeneous reflectivity background medium. The method includes reconstructing an image of the unknown internal structure of the object from the measurements by solving an optimization problem corresponding to the computational domain of the object subject to boundary conditions of a cross-domain operator and a residual measurement operator. The cross-domain operator defines a propagation of the total wavefield from the computational domain of the object having the unknown internal structure of the object into a residual domain and back into the computational domain. The residual domain occupies a portion of the background domain located outside the computational domain. The residual measurement operator defines a propagation of the total wavefield from the computational domain into the residual domain and back to the receiver. The optimization problem is solved iteratively to minimize a difference between the measurements of the total wavefield and a wavefield synthesized using a measurement operator and a Green's function operator from the reconstructed image. The method further includes generating, via an output interface, the reconstructed image.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

The present disclosure provides a method and a system for tomographic imaging of an object in an inhomogeneous reflectivity background medium. The method and the system provide a computationally efficient solution to the problem of tomographic imaging by reducing the size of a computation problem associated with reconstruction of an image using the technique of tomographic imaging in the inhomogeneous reflectivity background medium. The implementation of the efficient solution will be described in conjunction with the description provided in the various embodiments provided below.

Figure 1:
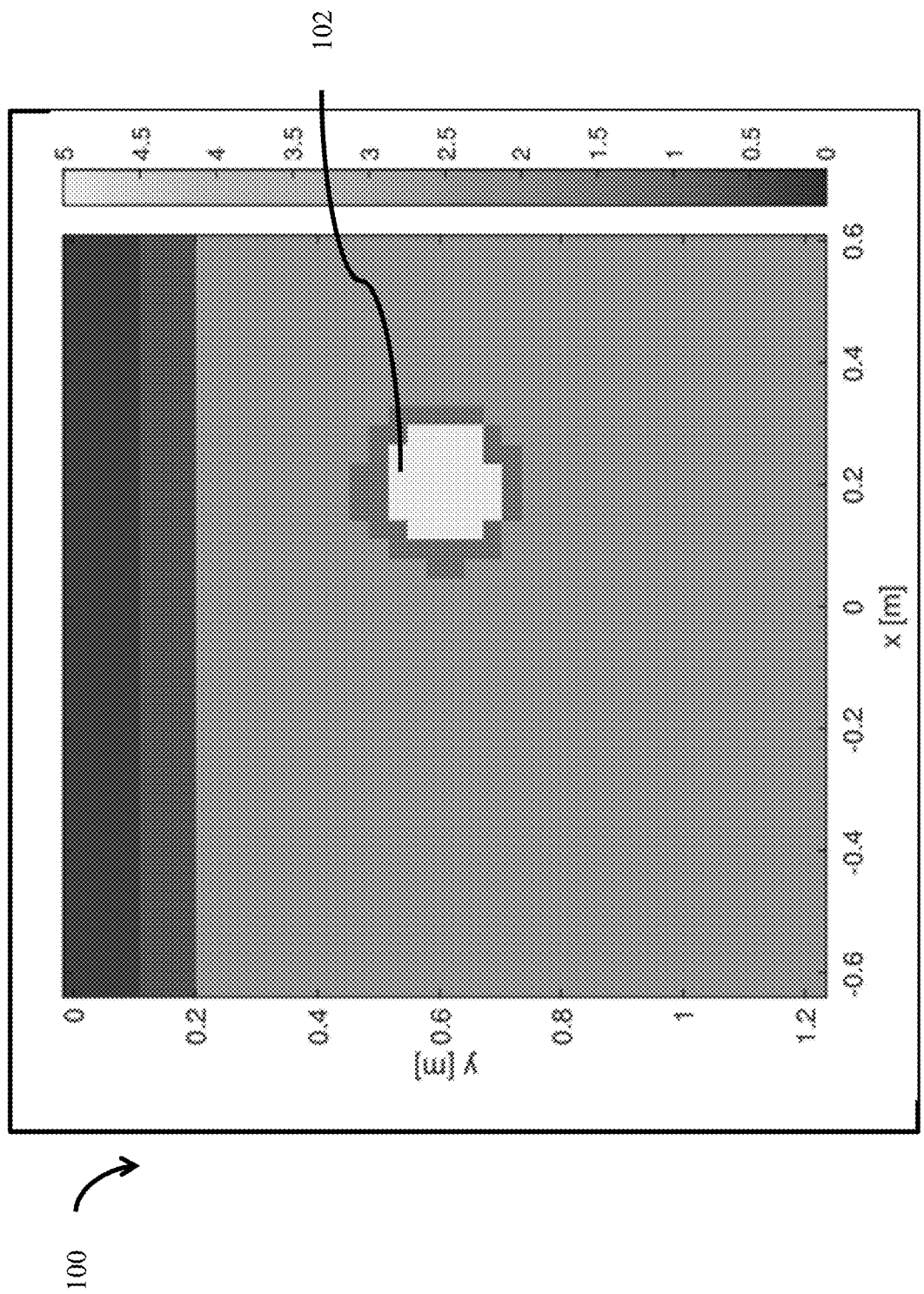
FIG. 1 shows a diagram of an inhomogeneous reflectivity background medium and an object embedded in an inhomogeneous reflectivity background medium, according to some embodiments of the present disclosure.

FIG. 1 illustrates a diagram of an inhomogeneous reflectivity background medium 100 and an object 102 embedded in the inhomogeneous reflectivity background medium 100, according to some embodiments of the present disclosure. The inhomogeneous reflectivity background medium 100 (referred to hereinafter as inhomogeneous background medium 100) may be composed of varied materials with high scattering or reflectivity properties that may cause poor reconstruction of an image of an unknown internal structure of the object 102. A few examples of the inhomogeneous background 100 may include a ground component, a wall component and/or the like that may be embedded with the object 102, such as a pipeline.

An image of the unknown internal structure of the object 102 may be reconstructed by a tomographic imaging system. The tomographic imaging system is further described next with reference to FIG. 2.

Figure 2:
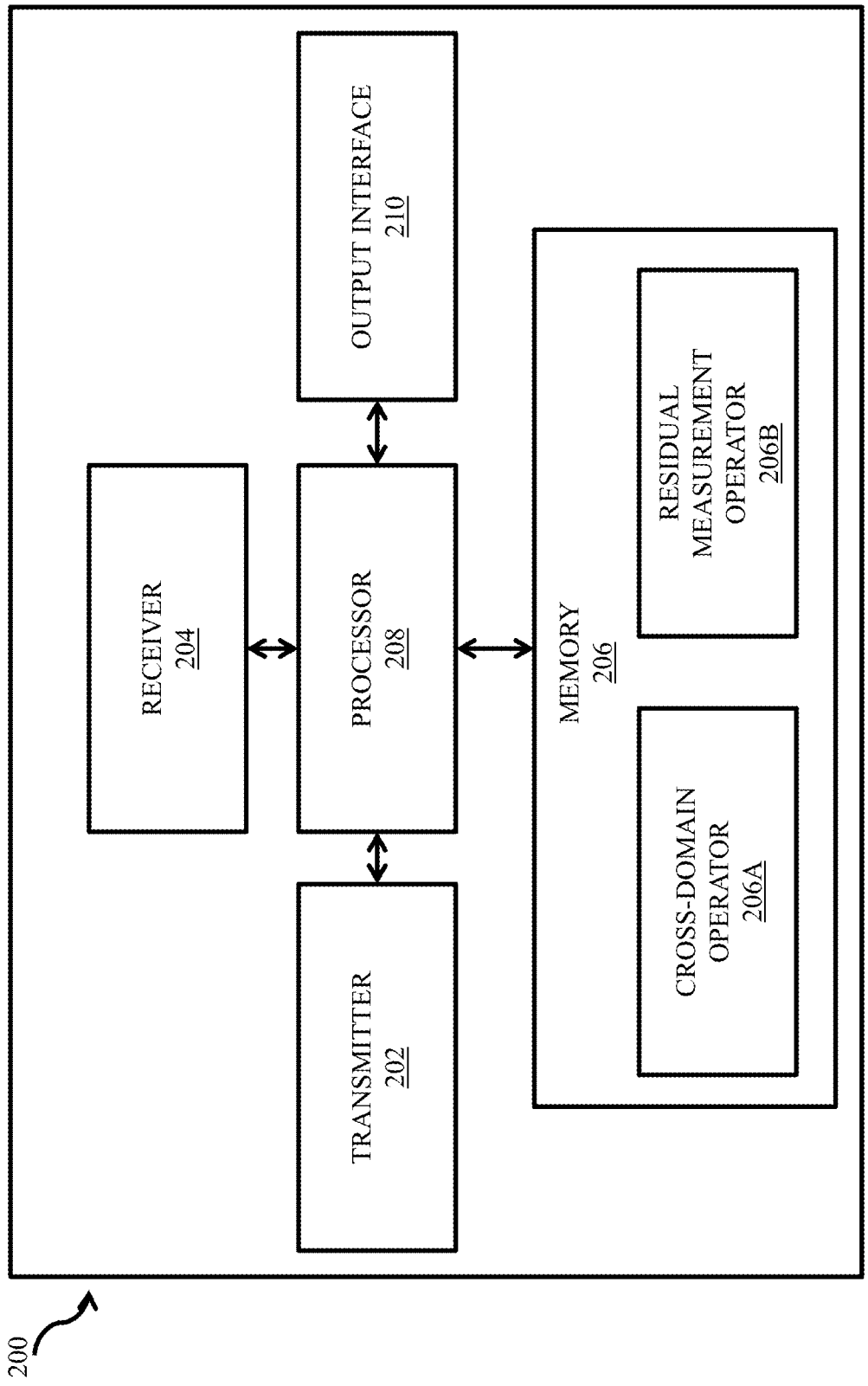
FIG. 2 shows components of a tomographic imaging system, according to some embodiments of the present disclosure.

FIG. 2 illustrates components of a tomographic imaging system 200, according to some embodiments of the present disclosure. The tomographic imaging system 200 includes a transmitter 202, a receiver 204, a memory 206, a processor 208 and an output interface 210. The processor 208 is operatively connected to the transmitter 202, the receiver 204, the memory 206 and the output interface 210 via a bus (not shown).

The transmitter 202 is configured to transmit an incident wavefield into an object, such as the object 102 embedded in an inhomogeneous reflectivity background medium, such as the inhomogeneous background medium 100. The inhomogeneous background medium 100 has a known internal structure and the object 102 occupies a background domain in the inhomogeneous background medium 100. The transmitter 202 may be a collective representation of one or more transmitters of the tomographic imaging system 200.

The receiver 204 is configured to receive measurements of a total wavefield. The total wavefield is a combination of the incident wavefield and a wavefield scattered by an unknown internal structure of the object 102 and the known internal structure of the background domain in the inhomogeneous background medium 100. The object 102 occupies a computational domain that is smaller than the background domain and residing inside the background domain of the inhomogeneous background medium 100. The receiver 204 may be a collective representation of one or more receivers of the tomographic imaging system 200. The one or more receivers may correspond to an array of antennas. In some example embodiments, the transmitter 202 and the receiver 204 may embodied as a transceiver to propagate a wave through the object 102 embedded in the inhomogeneous background medium 100 and to receive scattering waves of the propagated wave by materials of the object 102 and the inhomogeneous background medium 100.

The memory 206 is configured to store a cross-domain operator 206A and a residual measurement operator 206B. The cross-domain operator 206A is an operator that defines a propagation of the total wavefield from the computational domain of the object 102 having the unknown internal structure of the object 102 into a residual domain and back into the computational domain. The residual domain occupies a portion of the background domain located outside the computational domain. The residual measurement operator 206B is an operator that defines a propagation of the total wavefield from the computational domain into the residual domain and back to the receiver 204.

The processor 208 is configured to reconstruct an image of the unknown internal structure of the object 102 from the measurements by solving an optimization problem corresponding to the computational domain of the object 102 subject to boundary conditions of the stored cross-domain operator 206A and residual measurement operator 206B. The optimization problem is solved iteratively to minimize a difference between the measurements of the total wavefield and a wavefield synthesized using a measurement operator and a Green's function operator from the reconstructed image. The reconstructed image is outputted via the output interface 210.

In some example embodiments, the tomographic imaging system 200 may be set up based on a transmission mode. In the transmission mode, the transmitter 202 and the receiver 204 may be positioned on opposite sides of the inhomogeneous background medium 100. In some cases, there may be limitation to access only one side of the inhomogeneous background medium 100. For instance, applications like ground penetrating radar and seismic imaging may have the limitation allowing access to only one side of the inhomogeneous background medium 100. In such cases, the tomographic imaging system 200 may be set up based on a reflection mode. In the reflection mode, the transmitter 202 and the receiver 204 may be located on the same side of the inhomogeneous background medium 100. Such set up of the tomographic imaging system 200 based on the reflection mode for reconstructing an image of the object 102 is shown in FIG. 3.

Figure 3:
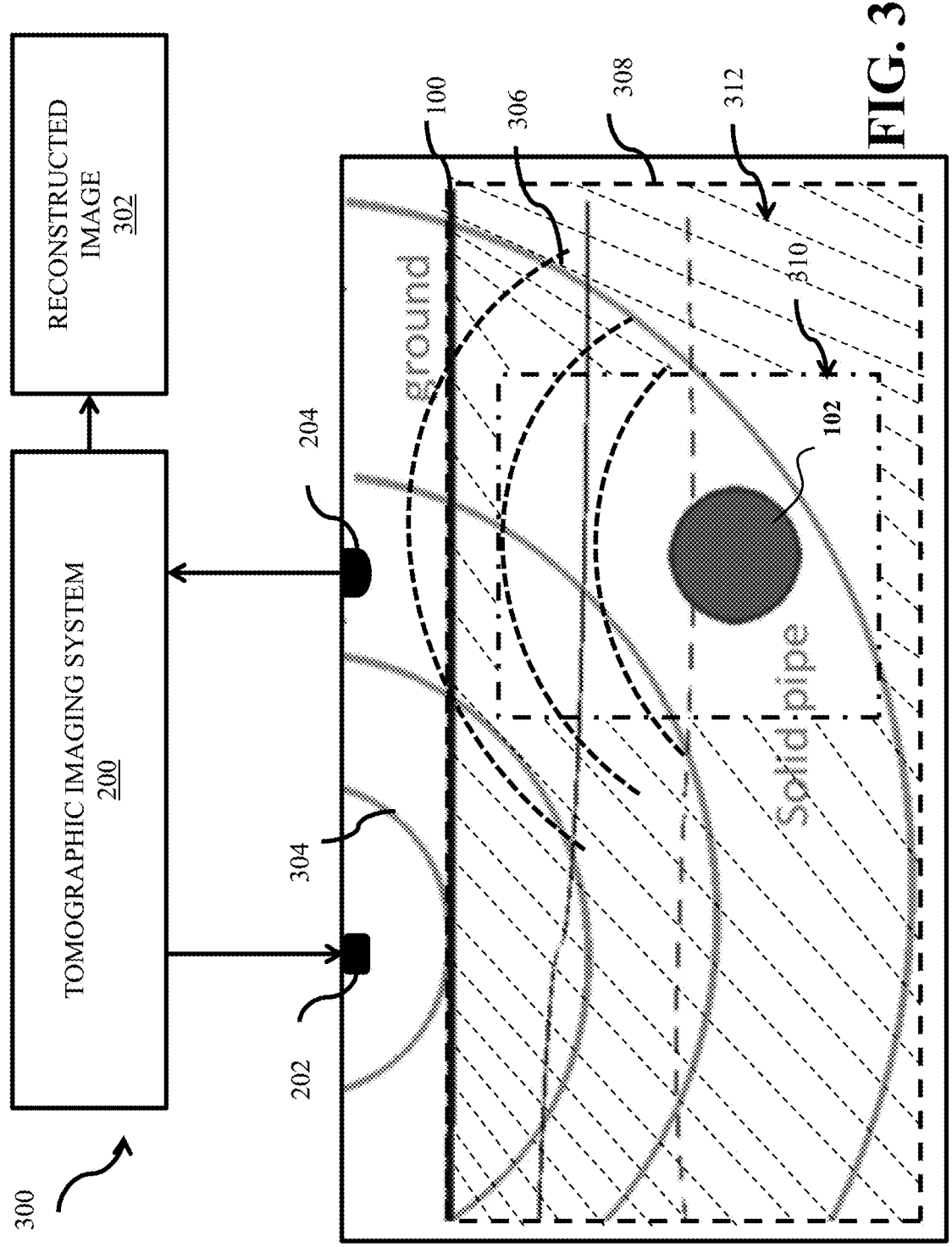
FIG. 3 shows an example set up for reconstructing an image for an object by the tomographic imaging system, according to some embodiments of the present disclosure.

FIG. 3 shows an example set up 300 for reconstructing an image 302 for the object 102 by the tomographic imaging system 200, according to some embodiments of the present disclosure. As shown in FIG. 3, the tomographic imaging system 200 is arranged in the reflection mode, such that the transmitter 202 and the receiver 204 are located on one side of inhomogeneous background medium 100, i.e. on top of a ground where the object 102 is embedded. The reflection mode estimates spatial distribution of permittivity of the object 102.

The transmitter 202 transmits an incident wavefield 304 through the inhomogeneous background medium 100. The incident wavefield 304 may include electromagnetic, acoustic, or optical waves, such as one or combination of a microwave pulse, a radar pulse, a laser pulse, an ultrasound pulse, and an acoustic pulse. The incident wavefield 304 propagates through the inhomogeneous background medium 100 and passes through the object 102. The incident wavefield 304 is scattered into multiple wavefields 306, referred to hereinafter as scattered wavefield 306 by the object 102 as well as due to reflectivity properties of the inhomogeneous background medium 100.

In some example embodiments, the receiver 204 may be arranged at a predetermined location with respect to the transmitter 202 for receiving the scattered wavefield 306. The receiver 204 measures the incident wavefield 304 and the scattered wavefield 306 as a total wavefield. To that end, the receiver 204 can only measure the total wavefield. The scattered wavefield 306 is computed from the measured total wavefield by subtracting the incident wavefield 304 (which is generally known). The total wavefield propagates through different portions of materials including the object 102 in the inhomogeneous background medium 100. The different portions include a background domain 308, a computational domain 310 and a residual domain 312 (shown by hatched lines). The background domain 308 is a region of interest or a spatial domain that is large enough to decay the incident wavefield 304 propagated between the transmitter 202 and the receiver 204. Thus, it may be considered that the background domain 308 is configured to decay the incident wavefield 304 propagated between the transmitter 202 and the receiver 204. The propagation of the incident wavefield 304 through the background domain 308 results in a negligible effect on the measurements of the total wavefield from the propagation of the total wavefield outside of the background domain 308. Therefore, the measurements from the propagation of the wavefield outside of the background domain are not affected. The computational domain 310 is a smaller region within the background domain 308 that the object 102 is located. The residual domain 312 is the portion of the background domain that lies outside of the computational domain 310, as shown by hatched lines in FIG. 3

The propagation of the total wavefield from the computational domain 310 into the residual domain 312 and from the residual domain 312 back into the computational domain 310 is defined by the cross-domain operator 206A. The cross-domain operator 206A corresponds to a mapping function for the total wavefield that maps each grid point in the computational domain 310 to each corresponding grid point in the residual domain 312.

The total wavefield also propagates from the computational domain 310 into the residual domain 312 and back to the receiver 204. The propagation of the total wavefield from the computational domain 310, the residual domain 312 and to the receiver 204 is defined by the residual measurement operator 206B. The residual measurement operator 206B is a mapping function for the total wavefield in the computational domain that maps from each grid point in the computational domain to each location of corresponding one or more antennas of the receiver 204.

The receiver 204 sends the measurements of the total wavefield to the processor 208 that reconstructs an image 302 of an internal structure of the object 102. The reconstructed image 302 represents a visualization of the internal structure of the object 102 that may be in a two-dimensional (2D) or a three-dimensional (3D) representation. The reconstructed image 302 may include information of refractive indices of material inside the object 102, distribution of permittivity of material inside the object 102, and combination thereof. Each location, such as pixel value in the reconstructed image 302 may provide a value of dielectric permittivity for a portion of the material of the object 102 corresponding to that location.

In one example embodiment, the image of the object 102 may be represented in a vector form as $x \in C^N$. The image may be reconstructed by processing measurements of the scattered wavefield 306 in F-dimensional frequency-domain. The scattered wavefield 306 ($\{\tilde{y}_m\}_{m=1}^{M}$) is measured from M distributed antennas of the receiver 204. In some cases, the antennas suffer from position ambiguity that impacts the reconstruction of the image 302. To that end, a propagation of the scattered wavefield 306 at correct antenna positions may be represented by a propagation matrix ($\tilde{A}_m$) and corresponding propagation of the scattered wavefield 306 at incorrect antenna positions may be represented by a propagation matrix ($A_m$). The position ambiguity of antennas may be modeled as a time-domain convolution with the measurements of the scattered wavefield 306, or equivalently, as a gain and phase ambiguity in the frequency-domain of the transmitted incident wavefield 304, that is, $$\tilde{y}_m = D_{\hat{g}_m} A_m x \tag{1}$$

where $D_{\hat{g}_m}$ is a diagonal matrix with a phase correction vector $\hat{g}_m \in C^F$ on its diagonal entries. However, the measurements of the scattered wavefield in F-dimensional frequency domain in the inhomogeneous background domain 100 may provide less information for the reconstruction of the image 302.

To that end, the image 302 is reconstructed by solving an optimization problem corresponding to the computational domain 310. The optimization problem of the computational domain 310 is solved with boundary conditions of the cross-domain operator 206A and residual measurement operator 206B. The optimization problem is solved in iterative manner, which is further described next with reference to FIG. 4.

Figure 4:
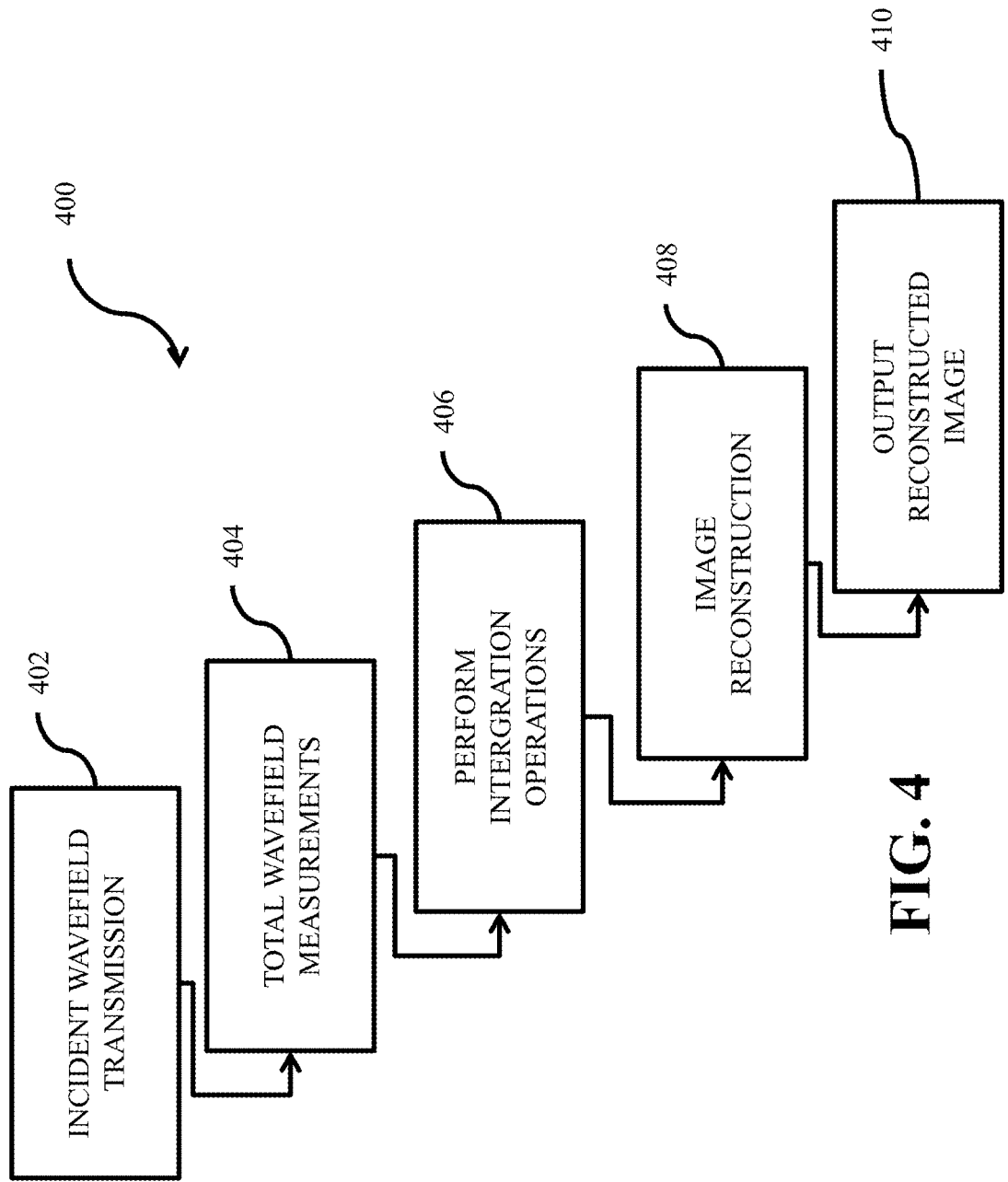
FIG. 4 shows a process for rendering a reconstructed image of the internal structure of the object, according to some embodiments of the present disclosure.

FIG. 4 shows a process 400 for rendering the reconstructed image 302 of the internal structure of the object 102, according to some embodiments of the present disclosure. The process 400 is executed by the processor 208 of the tomographic imaging system 200. The process 400 starts at step 402, with transmission of the incident wavefield 304 to the object 102 embedded in the inhomogeneous background medium 100. When the incident wavefield 304 propagates through the object 102, the scattered wavefield 306 are reflected by the material properties of the object 102. These transmitted incident wavefield 304 and the scattered wavefield 306 are measured, at step 404, as total wavefield measurements by the receiver 204.

At step 406, the total measurements are processed to formulate wave propagation integral equations through a series of integration operations. The series of operations includes a first operation to perform an integral with a Green's function for each grid point in the residual domain 312. The Green's function may be centered at a grid point in the residual domain 312 over each grid point in the computational domain 308. Next, a second operation computes an updated total wavefield from an interaction of the total wavefield in the residual domain 312 with the material properties of the inhomogeneous background medium 100 inside the residual domain 312. In third operation another integral operation is performed. The integral operation is performed with a Green's function for each grid point in the computational domain 308. The Green's function is centered at a grid point in the computational domain 308 over each grid point in the residual domain 312.

In order to formulate the wave propagation integral equations, the total wavefield, i.e., the incident wavefield 304 and the scattered wavefield 306 may be represented by a wave equation in time-domain. The wave equation of the incident wavefield 304 and the scattered wavefield 306 in the time-domain may be equivalently represented in frequency-domain using a scalar Helmholtz equation. The scalar Helmholtz equation of the total wavefield may be formulated into an integral form using a scalar Lippmann-Schwinger equation. The scalar Lippmann-Schwinger equation is defined as, $$u_{sc}(x)=u_{in}(x)+k^2\int_\Omega g(x-r)u_{sc}(r)f(r)dr, \forall x \in \Omega \quad (2)$$

In equation (2), $u_{sc}: \Omega \to \mathbb{C}$ is the scattered wavefield 306 in a spatial domain or a region of interest, i.e., the background domain 308 ($\Omega$) in the inhomogeneous background medium 100, f corresponds to a function of parameters (e.g., permittivity or reflectivity properties) of the background domain 308 in the inhomogeneous background medium 100 denoted as f: $\Omega \to \mathbb{R}$ and g corresponds to a Green's function having free space boundary condition. The Green's function (g) is denoted as g: $\Omega \to \mathbb{C}$. Further, $u_{in}$ denotes the incident wavefield 304 emitted by the transmitter 202 and $k=2\pi/\lambda$ is wavenumber in a wavelength ($\lambda$) corresponding to the scattered wavefield 306.

The parameters of the inhomogeneous background medium 100 $f(x)=(\varepsilon(x)-\varepsilon_b)$ is a relative permittivity, where $\varepsilon(x)$ is permittivity of the object 102 and $\varepsilon_b$ is permittivity of the inhomogeneous background medium 100. The permittivity of the inhomogeneous background medium 100 is assumed to be a vacuum, then the permittivity of the inhomogeneous background medium 100 is represented as ($\varepsilon_{vacuum}=1$).

The free-space Green's function for the Helmholtz equation $(\nabla^2+k^2)g=\delta$ is given by:

$$(x) \triangleq \begin{cases} -\dfrac{i}{2k}e^{-ikr} & d=1 \\ -\dfrac{i}{4}H_0^{(2)}(kr) & d=2 \\ \dfrac{1}{4\pi r}e^{-ikr} & d=3 \end{cases}$$

where $r=\|x\|$, $H_0^{(2)}$ is a zero-order Hankel function of second kind, and d is the dimension of the background domain 308 ($\Omega$).

In some embodiments, the formulation of the wave propagation integral equations for the total wavefield corresponds to a forward problem. To that end, the forward problem involves computing synthesized background wavefield (y) for the incident wavefield 304 ($u_{in}$), the parameters of the inhomogeneous background medium (f), the Green's function of the background domain 308 (g) and the Green's function of the receiver (h). Then, the scattered wavefield 306 is measured at the receiver 204 as the following data equation:

$$y(x)=\int_\Omega h(x-r)f(r)u_{sc}(r)dr, \forall x \in \Gamma, \quad (3)$$

where h: $\Omega \to \mathbb{C}$ denotes Green's function of the receiver 204 and $\Gamma$ is a domain at the receiver 204.

Further, in some embodiments, the optimization problem for the computational domain 310 with boundary conditions of the cross-domain operator 206A and the residual measurement operator 206B is converted to another optimization problem having free space boundary conditions. To that end, the scalar Lippmann-Schwinger equation is used for a free-space background to describe the propagation of the scattered wavefield 306 and the incident wavefield 304 as follows, $$v=(I-G \operatorname{diag}(f))u,$$

$$y=H \operatorname{diag}(f)u \quad (4)$$

where $u \in \mathbb{C}^N$ is the scattered wavefield 306 and $v \in \mathbb{C}^N$ are the incident wavefield 304, N denotes number of gridpoints to discretize the background domain 308 ($\Omega$), $f \in \mathbb{R}^N$ denotes the parameters of the background domain 308, $G \in \mathbb{C}^{N \times N}$ and $H \in \mathbb{C}^{n_{rec} \times N}$ are a Green's functions of the background domain 308 and the receiver 204, respectively. Let $n_{rec}$ be number of antennas at the receiver 204 that discretizes domain $\Gamma$ of the receiver 204, and $y \in \mathbb{C}^{n_{rec}}$ noise-free scattered wavefield measured at the receiver 204.

If $f_b$ is denoted as a background scene defined over the background domain 308 ($\Omega$), then the Lippmann-Schwinger equation (3) and the measured total wavefield from the inhomogeneous background medium 100 is given by:

$$v=(I-G \operatorname{diag}(f_b))u_b,$$

$$y_b=H \operatorname{diag}(f_b)u_b \quad \text{i. (5)}$$

Now, the computational domain 310 is denoted as $\Omega_0$ and the computational domain which is a portion of the background domain 308 is defined as $\Omega_0 \subset \Omega$. For the computational domain 310 ($\Omega_0$), corresponding permittivity ($f_d$) is updated as based on difference between the parameters of the inhomogeneous background medium 100 (f) and the parameters of the background domain 308 ($f_b$). The difference is denoted as $f_d=f-f_b$.

In some cases, the updated permittivity ($f_d$) may be zero-valued at the boundary of the computational domain 310 ($\Omega_0$) and inside the set $\Omega_0^c := \Omega \setminus \Omega_0$.

When the optimization problem of the computational domain 310 corresponding to boundary conditions is converted into the optimization problem of the computational domain 310 corresponding to free boundary conditions, a background wavefield is synthesized. The background wavefield is synthesized at each grid point in the background domain 308 and measurements of the background wavefield at the receiver 204 due to propagation of the incident wavefield 304 into the background domain 308 that has a known internal structure of the inhomogeneous background medium 100. At the same time of synthesizing the background wavefield, a difference wavefield defined as ($u_d := u - u_b$) along with the unknown internal structure of the object 102 is computed by forming a difference PDE operator (P). The PDE operator discretizes a PDE describing an interaction between the cross-domain operator 206A, the residual measurement operator 206B, the measurement operator, the Green's function operator, the incident wavefield 304, the background wavefield, the difference wavefield, and the unknown internal structure of the object 102.

Further, from the LS equations defined above, since the incident wavefield 304 (v) is the same, then $$(I - G\text{diag}(f_b + f_d))(u_b + u_d) = (I - G\text{diag}(f_b))u_b \quad (6)$$

$$\Leftrightarrow u_d - G\text{diag}(f_d)(u_b + u_d) - G\text{diag}(f_b)u_d = 0$$

$$\Leftrightarrow u_d - G\text{diag}(f_d)(u_b + u_d) = G\text{diag}(f_b)u_d$$

$$\Leftrightarrow u_d|_{\Omega_0} - G\text{diag}(f_d)(u_b + u_d) = (G\text{diag}(f_b)u_d)|_{\Omega_0} + (G\text{diag}(f_b)u_d) - u_d\big)$$

$$\big|_{\Omega/\Omega_0}$$

$$\Leftrightarrow \begin{cases} (1)\, u_d|_{\Omega_0} - G\text{diag}(f_d)(u_b + u_d)|_{\Omega_0} = \\ G_{\Omega_0\Omega_0}\text{diag}(f_{b\Omega_0})u_{d\Omega_0} + G_{\Omega_0\Omega_0^C}\text{diag}\big(f_{b\Omega_0^C}\big) \\ \quad (2) G_{\Omega_0^C\Omega_0}\text{diag}(f_{b\Omega_0})u_{d\Omega_0} + \\ G_{\Omega_0^C\Omega_0}\text{diag}(f_d)\big(u_{b\Omega_0} + u_{d\Omega_0}\big) + G_{\Omega_0^C\Omega_0^C}\text{diag}\big(f_{b\Omega_0^C}\big)u_d \end{cases} = u_{d\Omega_0^C}(1)$$

where a convolution operator with a homogeneous Green's function (G) is decomposed into:

$$G := \begin{bmatrix} G_{\Omega_0\Omega_0} & G_{\Omega_0\Omega_0^C} \\ G_{\Omega_0^C\Omega_0} & G_{\Omega_0^C\Omega_0^C} \end{bmatrix}.$$

From equation (1) above, the scattered wavefield 306 corresponding to the computational domain 310 $u_{d\Omega_0^C}$ is represented as a function of as $u_{d\Omega_0}$ in the following:

$$\Leftrightarrow u_{d\Omega_0^C} = \quad (2)$$

$$\big(I - G_{\Omega_0^C\Omega_0^C}\text{diag}\big(f_{b\Omega_0^C}\big)\big)^{-1} G_{\Omega_0^C\Omega_0}\big(\text{diag}(f_{b\Omega_0} + f_d)u_{d\Omega_0} + \text{diag}(f_d)u_{b\Omega_0}$$

Define $Q := G_{\Omega_0\Omega_0^C}\text{diag}\big(f_{b\Omega_0^C}\big)\big(I - G_{\Omega_0^C\Omega_0^C}\text{diag}\big(f_{b\Omega_0^C}\big)\big)^{-1} G_{\Omega_0^C\Omega_0}$ (7)

as the cross domain operator 206A, then equation (1) is rewritten as follows:

$$\Leftrightarrow (I-(G_{\Omega_0\Omega_0}+Q)\text{diag}(f_b+f_d)u_d|_{\Omega_0})=(G_{\Omega_0\Omega_0}+Q)\text{diag}(f_b) u_b \quad (8)$$

Next, the measurement equations of the total wavefield are obtained as, $$y-y_b = H\,\text{diag}(f_b+f_d)(u_b+u_d) - H\,\text{diag}(f_b)u_b \Leftrightarrow \Delta y = H\,\text{diag}(u_b+u_d)f_d + H\,\text{diag}(f_b)u_d \Leftrightarrow \Delta y = H\,\text{diag}(u_b+u_d) f_d + (H\,\text{diag}(f_b)u_d)|\Omega_0+m, \quad (9)$$

where $m := (H_{\Omega_0^C}\text{diag}(f_{b\Omega_0^C})u_{d\Omega_0^C}$. Using the equivalence relation for equation (2) above, the residual measurement operator (P) 206B is defined as, $$P := H_{\Omega_0^C}\text{diag}(f_{b\Omega_0^C})(I-G_{\Omega_0^C\Omega_0^C}\text{diag}(f_{b\Omega_0^C}))^{-1}G_{\Omega_0^C\Omega_0}$$

The measurement equation may be written as a function of $f_d$ and $u_{d\Omega_0}$ as follows:

$$\Delta y = H\,\text{diag}(u_b+u_d)f_d + (H_{\Omega_0}\text{diag}(f_{b\Omega_0})+P\,\text{diag}(f_{b\Omega_0}+f_d))u_{d\Omega_0}+P\,\text{diag}(f_d)u_{b\Omega_0}. \quad (10)$$

Consequently, the following set of equations is formulated to solve for the permittivity update $f_d$ and the difference wavefield $u_d$ using operator defined only over the reduced domain, i.e., the computational domain 310 ($\Omega_0$):

$$(I-(G+Q)\text{diag}(f_b+f_d))u_d = (G+Q)\text{diag}(f_d)(u_b), \Delta y = (H+P)\,\text{diag}(u_b+u_d)f_d + (H+P)\text{diag}(f_b)u_d \quad (11)$$

In some embodiments, the difference wavefield ($u_d$) with zero-value over the background domain 308 ($\Omega$) and/or the computational domain 310 ($\Omega_0$) reduces the domain restriction, i.e., the background domain 308 to the computational domain 310 ($\Omega_0$).

$$\min_{f_d, u_d} \frac{1}{2}\|\Delta y - (H+P)\text{diag}(u_b+u_d)f_d - (H+P)\text{diag}(f_b)u_d\|_2^2, \quad (12)$$

subject to $(I-(G+Q)\text{diag}(f_b+f_d))u_d = (G+Q)\text{diag}(f_d)(u_b)$

At step 408, the image 302 is reconstructed by solving an optimization problem corresponding to the computational domain 310 according to equation (12). The optimization problem corresponding to the computational domain 310 may be solved based on an inverse problem, which is described in FIG. 5.

At step 410, the reconstructed image 302 is outputted via the output interface 210. In some example embodiments, the reconstructed image 302 may correspond to an image of refractive indices of material inside the object. In some other example embodiments, the reconstructed image 302 may include distribution of permittivity of material inside the object.

In some embodiments, the reformulated wave propagation integral equations incorporated with parameters of the background domain may be coupled with an incremental frequency inversion framework. The incremental frequency inversion framework iteratively solves the optimization problem for the reconstruction of the image 302, which is further described next with reference to FIG. 5.

Figure 5:
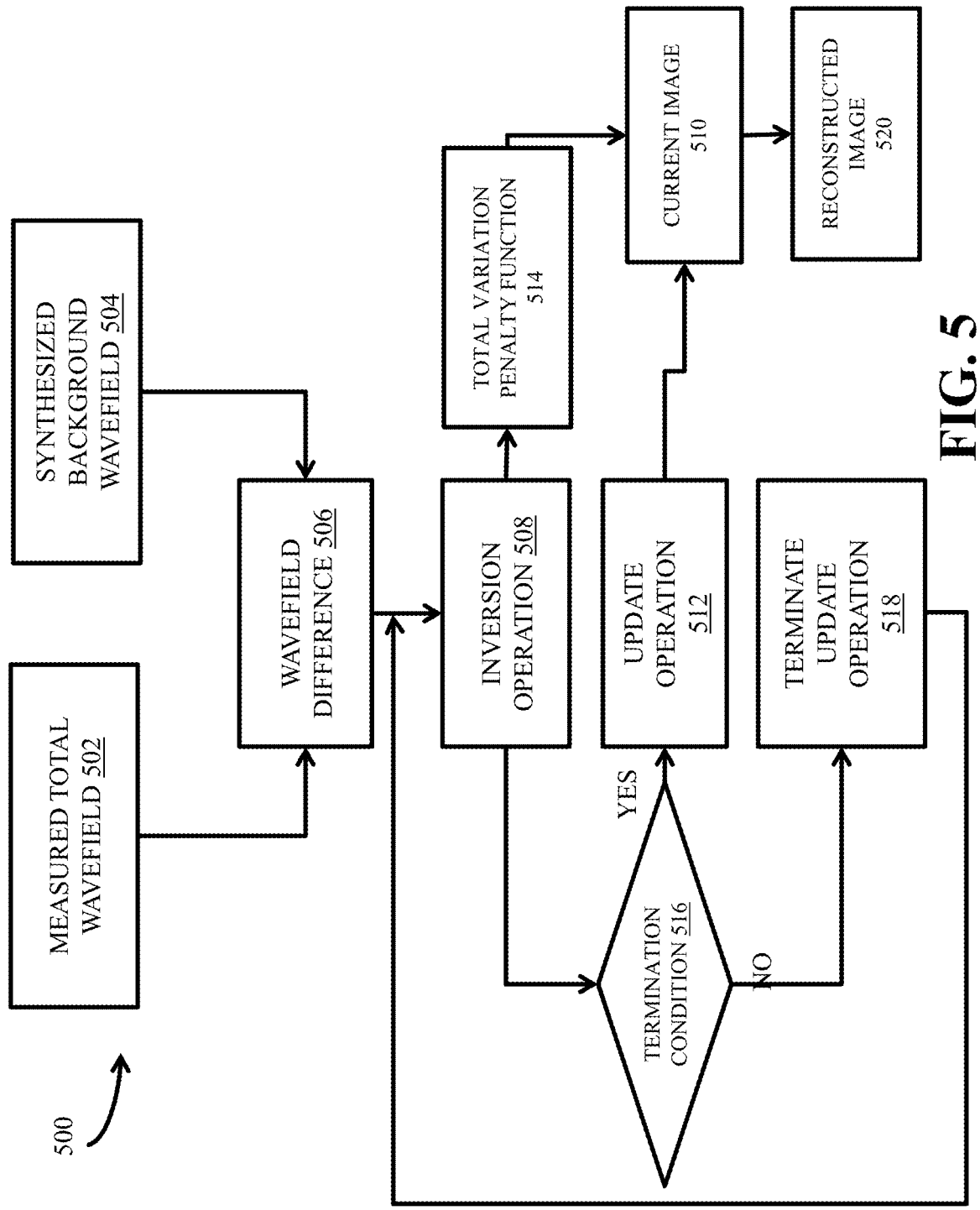
FIG. 5 shows an incremental frequency inversion framework, according to some embodiments of the present disclosure.

FIG. 5 shows an incremental frequency inversion framework 500 of the tomographic imaging system 200 for the image reconstruction 408 step of method 400 for the object 102, according to some embodiments of the present disclosure. In the incremental frequency inversion framework 500, a measured total wavefield 504 and a synthesized background wavefield 504 are compared. The measured total wavefield 504 corresponds to a total wavefield measurement that includes the incident wavefield 304 and the scattered wavefield 306. The synthesized background wavefield 504 is obtained from the conversion of the optimization problem that has free space boundary conditions, such as the scalar Lippmann-Schwinger equation (equation (4)).

The comparison between the measured total wavefield 504 and the synthesized background wavefield 504 computes a wavefield difference 506. The wavefield difference 506 is computed along with the unknown internal structure of the object 102 by forming the PDE operator. The PDE operator discretizes a PDE that describes an interaction between the cross-domain operator 206A, the residual measurement operator 206B, the measurement operator, the Green's function operator, the incident wavefield 304, the synthesized background wavefield 504, the difference wavefield 506, and the unknown internal structure of the object 102.

After the computation of the wavefield difference 506, an inversion operation 508 is executed by the processor 208. The inversion operation 508 solves the PDE constrained optimization problem in equation (12). The inversion operation 508 solves the optimization problem in equation (12) by inverting the PDE operator for a current image 510, i.e., a model of the internal structure of the object 102. In some embodiments, the current image 510 may be initialized by minimizing a difference between a portion of the scattered wavefield 306 measured at a current frequency component (e.g., 10 MHz, or 10-20 MHz) and a wavefield synthesized from the current image 510.

Further, the PDE operator is inverted to determine a Jacobian, which is a determinant of a matrix of the scattered wavefield 306 with respect to the current image 510 of the internal structure of the object 102. The matrix contains first-order partial derivatives of the PDE. In some embodiments, the inversion operation inverting the PDE operator is performed using a preconditioned conjugate gradient method. The preconditioned conjugate gradient method computes a preconditioner of the PDE operator using a deep learning network that is trained to determine an estimate of the scattered wavefield from the incident wavefield 304.

In some example embodiments, the deep learning network may include a U-net architecture. The U-net architecture has a U-shape structure that skips connections between layers of the same dimensions in the deep learning network. The skipped connections enable the deep learning network to compute the preconditioner for the PDE operator in an efficient as well as robust manner. To that end, the preconditioner may be computed in presence of noise. In some example embodiments, the deep neural network-based preconditioner may be trained for a specific dimension of an image (e.g. the image 302) of an object (e.g., the object 102), a specific configuration of the transmitter 202 and the receiver 204. Moreover, the deep learning network may be trained to approximate the inverse of the PDE operator from the incident wavefield 304 and applying the adjoint of the PDE operator that is defined by assuming any image of the material of the object 102 and outputting an estimate of the scattered wavefield 306.

Further, the incremental frequency inversion framework 500 iteratively solves the optimization problem (i.e., equation (11)) for the image reconstruction of the object 102. To that end, the image 302 may reconstructed as a sequence of constrained nonlinear least-squares subproblems. To that end, the measurements of the total wavefield measured by the receiver 204 that include frequency components ($n_f$) are indexed in increasing an order from 1 to $n_f$, i.e., from low frequency to high frequency. For instance, the index for the frequency components ($n_f$) may vary from 10 MHz index to 50 MHz index.

The incremental frequency inversion framework 500 iteratively estimates the model, i.e., the current image 510 of the object 102 from the low to high-frequency order (e.g., from 10 MHz index to 50 MHz index). During the estimation of the model of the object 102, cost function corresponding to the low frequency is used as a regularizer for high-frequency inversions.

for $k = 1, \ldots, n_f$: (13)

$$(f^k, u^*) \triangleq \underset{f,u}{\mathrm{argmin}}\left\{\mathcal{D}_k(f, u_k) + \sum_{j=1}^{k-1}\lambda_j \mathcal{D}_j(f, u_j) + \mathcal{R}(f)\right.$$

$$\left. \mathrm{s.t.} \; (I - G_j \mathrm{diag}(f))u_{ij} = v_{ij} \forall \, i, j\right\},$$

where $D_j(f, u_j) = \sum_{i=1}^{n_t} D_{ij}(f, u_{ij})$, and $\lambda_j \in (0,1]$ are regularization parameters that control the impact of the low-frequencies cost functions with respect to the $k^{th}$-frequency cost function. Therefore, instead of solving a single non-convex minimization problem in equation (10), the nonlinear least square subproblems corresponding to the frequency components ($n_f$) are solved sequentially according to equation (12). The sequential solving of the subproblems outputs a sequence of solutions that approaches towards a global minimizer. The sequence of solutions iteratively executes an update operation 512 for reconstructing an image of the object 102.

The update operation 512 updates the current image 510 of the object 102 by minimizing a cost function between the measured the total wavefield 502 and a synthesized total wavefield. The cost function between the measurements of the total wavefield 502 and the synthesized total wavefield may include one of a combination of a Euclidean distance between the total wavefield 502 and the synthesized total wavefield, a one-norm distance between the total wavefield 502 and the synthesized total wavefield, and a summation of the Euclidean distance and a barrier function. The barrier function is a summation of an exponential function that penalizes the update operation 512 of the current image 510.

In some embodiments, the synthesized total wavefield is obtained by combining the Jacobian of the scattered wavefield 306 and a quasi-Newton descent direction of the cost function with respect to the current image 510. To that end, the optimization problem in equation (12) may be solved using a Quasi-Newton method. The Quasi-Newton method computes a gradient of the cost function with respect to the current image 510 of the object 102. The computed gradient of the cost function is represented as, $$F(f, u) \triangleq \mathcal{D}_k(f, u_k) + \sum_{j=1}^{k-1}\lambda_j \mathcal{D}_j(f, u_j)$$

In some example embodiments, the gradient of the cost function may be computed using an adjoint-state method. The adjoint-state method simultaneously estimates the current image 510 and the scattered wavefield 306 at each frequency of the frequency components ($n_f$). After the computation of the gradient, a Quasi-Newton descent direction is obtained by forming an approximation to a Hessian matrix using a limited-memory Broydon-Fletcher-Goldfarb-Shanno (BFGS) algorithm. The Hessian matrix is a matrix of second ordered PDE for the cost function and the limited-memory BFGS algorithm iteratively solves the optimization problem in equation (13).

For $(t+1)^{th}$ iteration, the current image 510 of the object 102 is updated as, $$f^{(t+1)} \triangleq \mathcal{P}_{TV \leq \tau}(f^{(t)} - \gamma_t \tilde{H}^{-1}\nabla_f \mathcal{F}(f^{(t)}, u))$$

where $\gamma_t$ is a step length computed using backtracking line-search, $\tilde{H}$ is the limited-memory BFGS Hessian matrix, $\mathcal{P}_{TV \leq \tau}(\bullet)$ is a proximal operator for a constrained total-variation penalty function 514. The total-variation penalty function 514 is a noise-removal or filtering technique for the image reconstruction of the object 102 that may be constrained by an upper bound as the constrained parameter ($\tau$).

To that end, the updated current image 510 is projected onto the constrained total-variation penalty function 514. The total-variation penalty function 514 uses a total-variation norm of a gradient for the regularization of the update operation 508.

For each frequency batch in equation (13), the current image 510 is updated until a termination condition 516 is met. In some example embodiments, the termination condition 516 may be satisfied when the total-variation norm of the gradient diminishes to a small value. When the total-variation norm of the gradient diminishes to the small value, a terminate update operation 518 is triggered.

To that end, the total-variation norm of a function (u:Ω→ ℝ) is represented with a bounded function φ as $$TV(u) \triangleq sup\{u(x)div\phi dx: \phi \in C_c^1(\Omega, \mathbb{R}^d), \|\phi\|_\infty \leq 1\}, = \int_\Omega |\nabla u(x)| dx = \|\nabla u(x)\|_1.$$

The total-variation norm measures the total change in the derivative of the total-variation penalty function 514 over a finite domain. The total-variation penalty function 514 is constrained by the constrained parameter (τ) such that $$\mathcal{R}_{TV}(f) \triangleq \delta(TV(f) \leq \tau), \quad (14)$$

where δ(•) is an indicator function. Let D be the finite difference operator that discretizes the gradient, then TV (f)=$\|Df\|_1$.

In one embodiment, a proximal operator ($\mathcal{P}$) is defined for the constrained the total-variation norm as, $$\mathcal{P}_{TV \leq \tau}(w) \triangleq \arg\min_f \left\{ \frac{1}{2}\|f - w\|_2^2 + \mathcal{R}_{TV}(f) \right\} \quad (15)$$

that may be evaluated using alternating direction method of multipliers (ADMM), as shown in Algorithm 1.

---

Algorithm 1:

Input: w ∈ $\mathbb{R}^n$, D ∈ $\mathbb{R}^{m \times n}$, τ > 0, ρ > 0, $t_{max}$, γ ∈ (0,1]
Output: $f^{(t_{max})}$
1: $f^{(0)} = w^{(k)}, z^{(0)} = 0, \lambda^{(0)} = 0$
2: for t = 0 to $t_{max}$ do
3:     $f^{(t+1)} := (I - \rho D^T D)^{-1}(w + D^T(z^{(t)} - \lambda^{(t)}))$
4:     $z^{(t+1)} := \mathcal{P}_{\|\cdot\|_1 \leq \tau}(Df^{(t+1)} + \lambda^{(t+1)})$
5:     $\lambda^{(t+1)} := \lambda^{(t)} + \gamma(Df^{(t+1)} - z^{(t+1)})$
6:     check termination conditions
7: end for
8: return $f^{(t_{max})}$

---

Consequently, the regularization with total-variation penalty function 514 promotes a piecewise constant approximation of a true model of the object 102, such as a reconstructed image 520 of the object 102.

Figure 6:
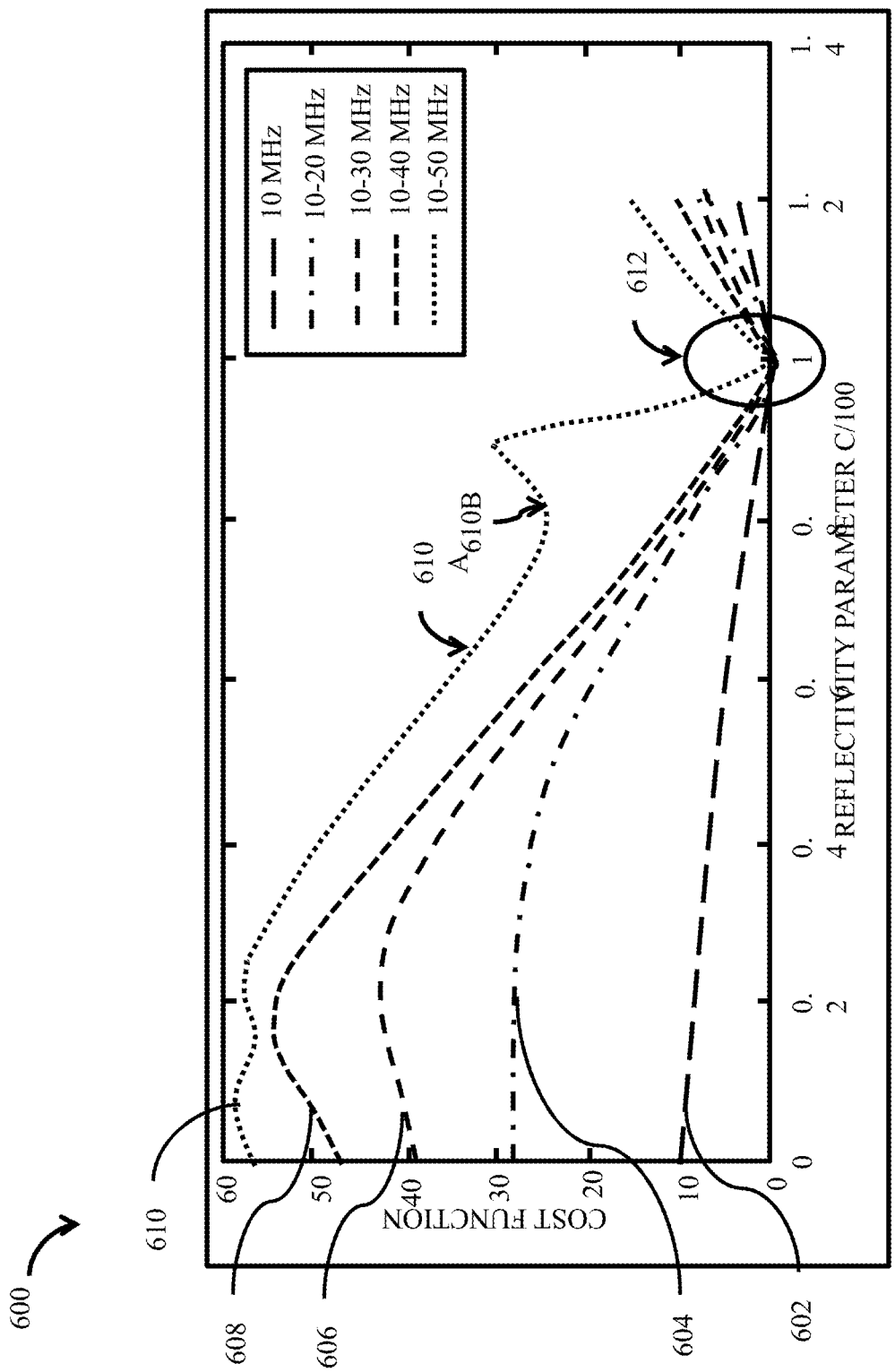
FIG. 6 shows a graphical representation depicting a cost function between measurements of a total wavefield and a synthesized total wavefield, according to some embodiments of the present disclosure.

The cost function indicative of a difference between the measured the total wavefield 502 and a synthesized total wavefield at different frequencies are shown in FIG. 6.

FIG. 6 shows a graphical representation 600 of a cost function corresponding to frequency components ($n_f$) of a wavefield relative to reflectivity parameter (c) of the inhomogeneous background medium 100, according to some embodiments of the present disclosure. The frequency components ($n_f$) range from 10 MHz index to 50 MHz index and the reflectivity parameter (c) ranges from 0 to 120. The cost function is a difference between measurements of a total wavefield (e.g., the measured total wavefield 502) and a synthesized total wavefield obtained from a model of the object 102, e.g., the current image 510. The cost function corresponding to the frequency components ($n_f$) ranging from 10 MHz index to 50 MHz index include a cost function 602 of frequency 10 MHz, a cost function 604 of joint frequencies 10-20 MHz, a cost function 606 of joint frequencies 10-30 MHz, a cost function 608 of joint frequencies 10-40 MHz and a cost function 610 of joint frequencies 10-50 MHz.

Using the incremental frequency inversion framework 500, the cost function for reconstructing an image of the object 102 is iteratively minimized by the processor 208 according to equation (12). For instance, in first iteration, the cost function 602 is minimized for reconstruction of an image, such as the current image 510 of the object 102. The reconstruction of the image 510 based on the minimization the cost function of frequency 10 MHz results in determining a global minima 612. The global minima 612 guides minimization of subsequent cost function 604, cost function 606, cost function 608 and cost function 610 in determining a corresponding solution that is in neighborhood of the global minima 612.

To that end, in next iteration, i.e., in second iteration, frequency of 20 MHz (which is higher than the frequency of 10 MHz) is added for minimizing the cost function 604 in neighborhood of the global minima 612 corresponding to the cost function 602. Likewise, in third iteration, a frequency of 30 MHz is added and the cost function 606 for frequencies of 10, 20 and 30 MHz in a neighborhood of a minima corresponding to the cost function 604 is minimized. In fourth iteration, a frequency of 40 MHz is added and the cost function 608 for joint frequencies of 10, 20, 30 and 40 MHz in a neighborhood of a minima corresponding to the cost function 606 is minimized. In fifth iteration, a frequency of 50 MHz is added and the cost function 610 for frequencies of 10, 20, 30, 40 and 50 MHz in a neighborhood of a minima corresponding to the cost function 608 is minimized. The minimization of the cost function 610 outputs global minima 610A and local minima 610B.

Figure 7A:
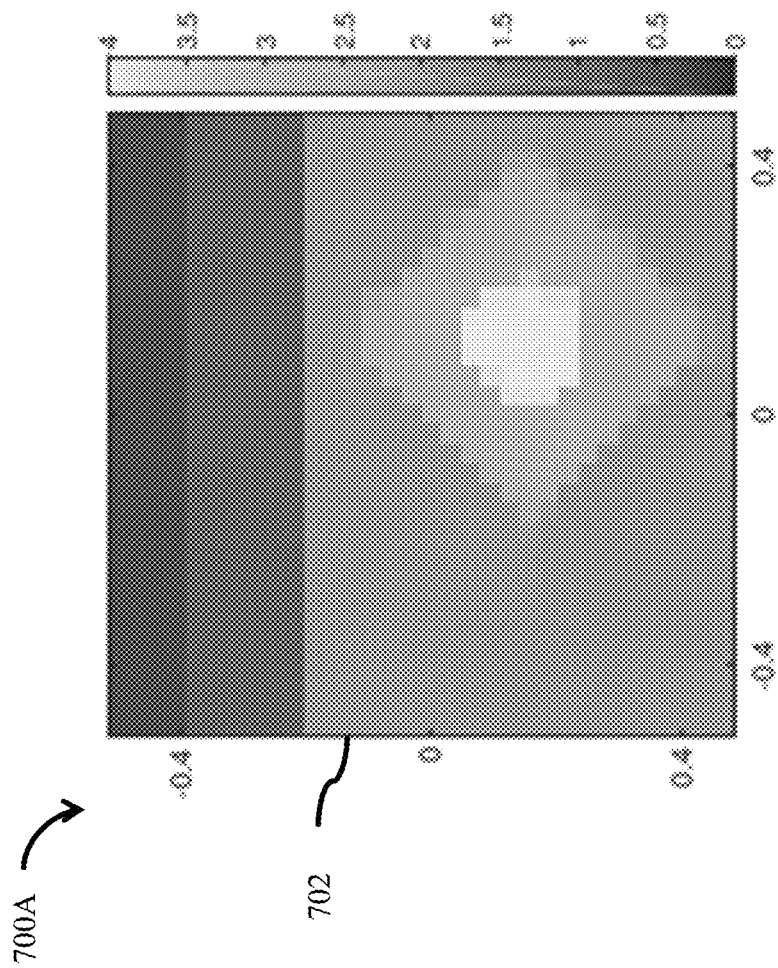
FIG. 7A shows a representation of a reconstructed image of the object embedded in the inhomogeneous background medium, according to some embodiments of the present disclosure.

An example of the reconstructed image 520 of the object 102 using the incremental frequency inversion framework 500 is shown in FIG. 7A.

FIG. 7A shows a representation 700A of a reconstructed image 702 of the object 102 embedded in the inhomogeneous background medium 100, according to some embodiments of the present disclosure. The reconstructed image 702 is an example of the image 520 that is rendered by the tomographic imaging system 200 using the incremental frequency inversion framework 500. The reconstructed image 702 visualizes a distribution of permittivity in the object 102 that describes an internal structure of the object 102 as well as a characterization of physical properties of the object 102.

As mentioned earlier that a background wavefield is synthesized, such as the background wavefield 504 during conversion of the optimization problem corresponding to free-space conditions. Such background wavefield 504 is shown in FIG. 7B.

Figure 7B:
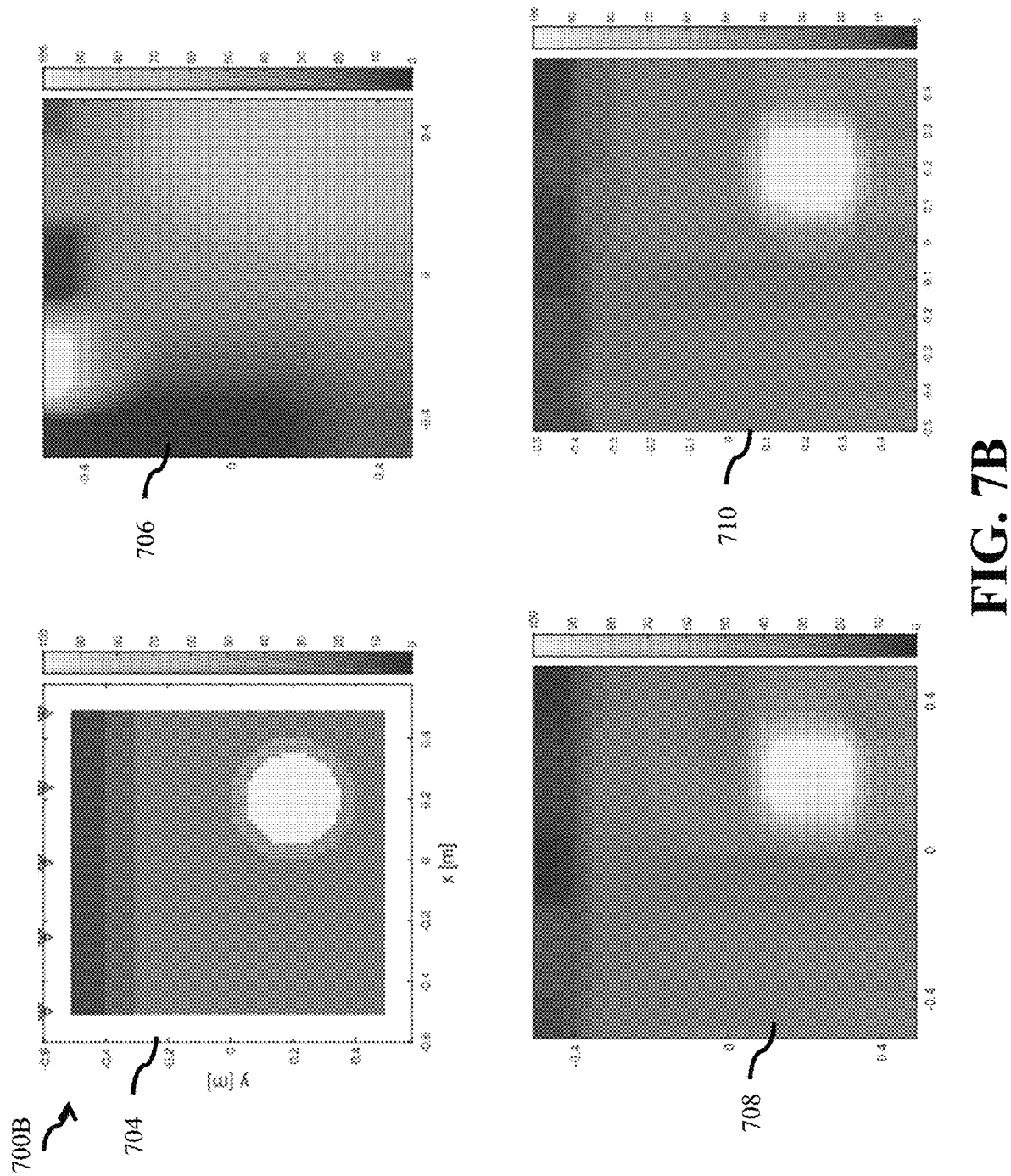
FIG. 7B shows a representation of a synthesized background wavefield of a background domain, according to some embodiments of the present disclosure.

FIG. 7B shows a representation 700B of a total target scene structure 704 where the object is embedded in a nonhomogeneous background medium, according to some embodiments of the present disclosure. The total target scene structure 704 may be reconstructed based on updates of the iteration of the incremental frequency inversion framework 500. For instance, the reconstructed scene structure may be updated as a synthesized scene structure 706 as frequency is incremented to 10 MHz. Consequently, a synthesized scene structure 708 may be obtained when frequency is incremented from 10 MHz to 100 Mhz. Likewise, a synthesized scene structure 710 may be obtained when frequency is incremented from 10 MHz to 800 MHz. The update of the synthesized scene structure 704 may be terminated when the termination condition 516 is met.

Figure 8:
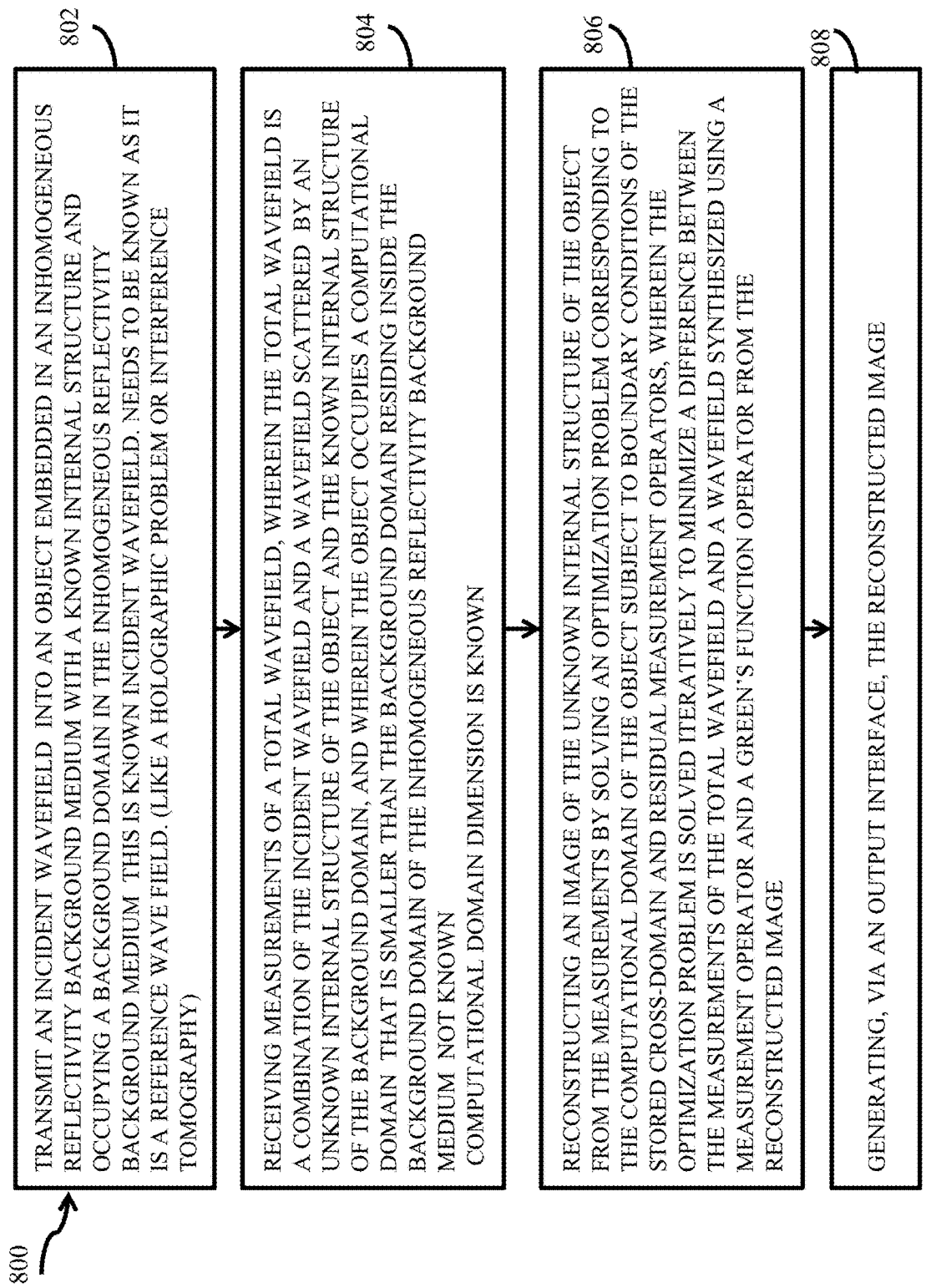
FIG. 8 shows a flow diagram of a method for reconstructing an image of an internal structure of an object, according to some embodiments of the present disclosure.

FIG. 8 shows a flow diagram of a method 800 for reconstructing an image (e.g., the image 700A) of an object (e.g., the object 102) embedded in an inhomogeneous background medium (e.g., the inhomogeneous background medium 100), according to some embodiments of the present disclosure. In some example embodiments, the method 800 is executed by the processor 208 of the tomographic imaging system 200. The method 800 starts at step 802 and ends at step 802.

At step 802, the method 800 includes transmitting an incident wavefield (e.g., the incident wavefield 304) into the object (e.g., the object 102) embedded in an inhomogeneous reflectivity background medium, (e.g., the inhomogeneous background medium 100) with a known internal structure and occupying a background domain (e.g., the background domain 308) in the inhomogeneous reflectivity background medium. The background domain is large enough to decay the incident wavefield propagated between the transmitter and the receiver through the background domain resulting in a negligible effect on the measurements of the total wavefield from the propagation of the total wavefield outside of the background domain.

At step 804, the method 800 includes receiving measurements of a total wavefield. The total wavefield is a combination of the incident wavefield and a wavefield scattered by an unknown internal structure of the object and the known internal structure of the background domain. The object occupies a computational domain (e.g., the computational domain 310) that is smaller than the background domain residing inside the background domain of the inhomogeneous reflectivity background medium.

At step 806, the method 800 includes reconstructing an image of the unknown internal structure of the object from the measurements by solving an optimization problem corresponding to the computational domain of the object subject to boundary conditions of a cross-domain operator (e.g., the cross-domain operator 206A) and a residual measurement operator (e.g., the residual measurement operator 206B). The cross-domain operator defines a propagation of the total wavefield from the computational domain of the object having the unknown internal structure of the object into a residual domain (e.g., the residual domain 312) and back into the computational domain. The cross-domain operator is a mapping function for the total wavefield in the computational domain from each grid point in the computational domain to each corresponding grid point in the residual domain. The residual domain occupies a portion of the background domain located outside the computational domain. The residual measurement operator defines a propagation of the total wavefield from the computational domain into the residual domain and back to the receiver. The optimization problem is solved iteratively to minimize a difference between the measurements of the total wavefield (e.g., the total wavefield 504) and a wavefield synthesized (e.g., the synthesized background wavefield 504) using a measurement operator and a Green's function operator from the reconstructed image. The residual measurement operator is a mapping function for the total wavefield in the computational domain from each grid point in the computational domain to each location of corresponding one or more antennas of the receiver. In some embodiments, the optimization problem corresponding to the computational domain of the object subject to boundary conditions of the cross-domain operator and the residual measurement operator is converted to another optimization problem having free space boundary conditions (i.e., equation (4)). The conversion of the optimization problem into the optimization problem with free space boundary conditions includes synthesizing a background wavefield (e.g., the synthesized background wavefield 504) in the background domain and measurements of the background wavefield 504 at the receiver. The conversion also includes computing difference wavefield (e.g., the wavefield difference 506) along with the unknown internal structure of the object by forming a difference PDE operator. The PDE operator discretizes a PDE that describes an interaction between the operators, such as the cross-domain operator, the residual measurement operator, the measurement operator, the Green's function operator, the wavefields, such as the incident wavefield, the background wavefield, the difference wavefield, and the unknown internal structure of the object. The PDE operator for a current image (e.g., the current image 510) of the object is inverted by an inversion operation (e.g., the inversion operation 508) to determine a Jacobian of the scattered wavefield with respect to the current image of the object. After the inversion operation, an update operation (e.g., the update operation 512) is executed to update the current image. The update operation is executed until a termination condition (e.g., the termination condition 516) is met. The updated current image of the object is then projected onto a constrained total variation penalty function (e.g., the constrained total variation penalty function 514).

At step 808, the method 800 includes generating, via an output interface (e.g., the output interface 210), the reconstructed image, such as the reconstructed image 702. In some example embodiments, the reconstructed image may include an image of refractive indices of material inside the object 102, a distribution of permittivity of the material inside the object 102 and a combination thereof.

Figure 9:
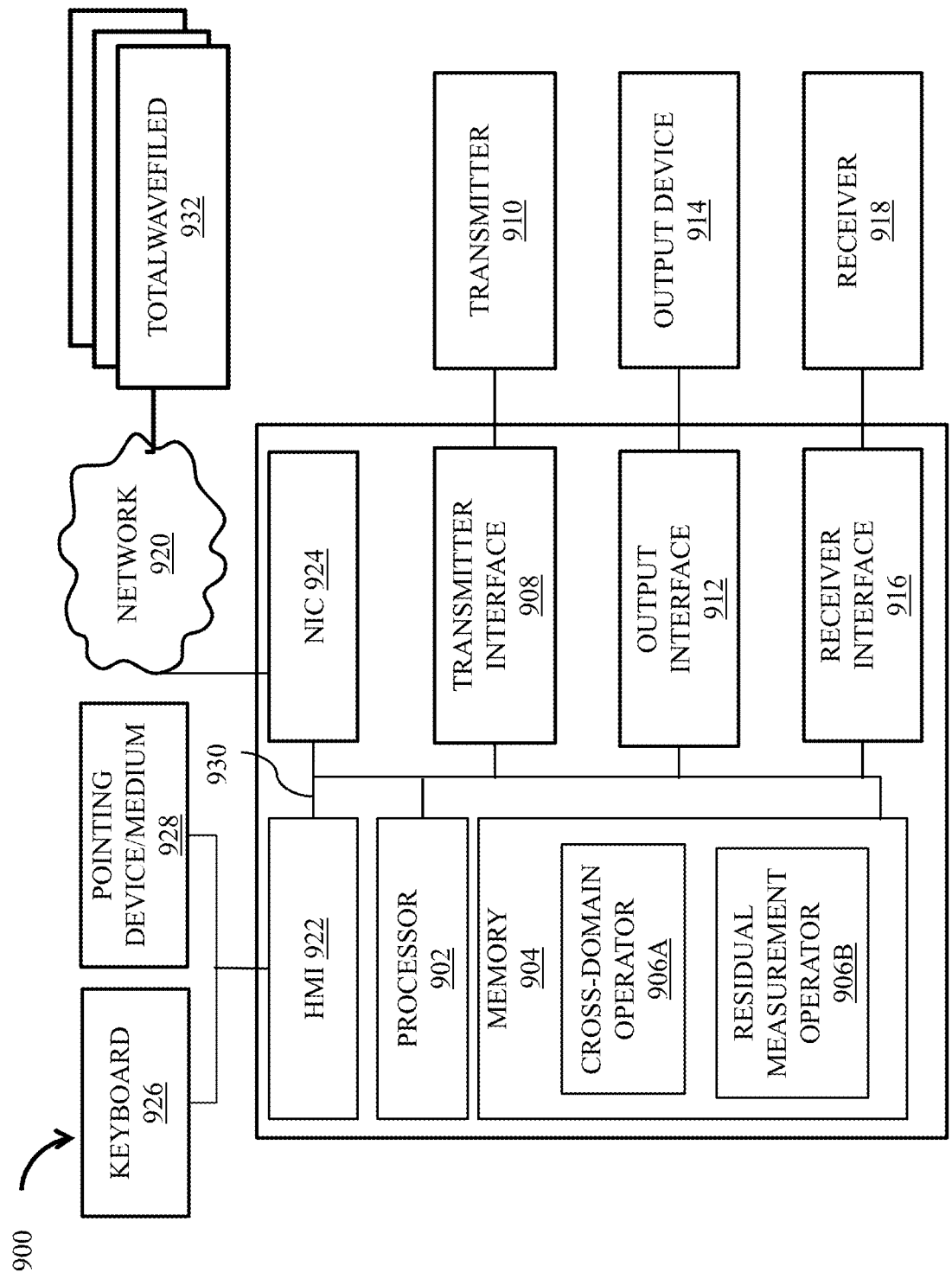
FIG. 9 shows a block diagram of a tomographic imaging system, according to some embodiments of the present disclosure.

FIG. 9 shows a block diagram of a tomographic imaging system 900, according to some embodiments of the present disclosure. The tomographic imaging system 900 corresponds to the tomographic imaging system 200. The tomographic imaging system 900 includes a processor 902 configured to execute stored instructions for the image reconstruction of the object 102. The processor 902 may be a single core processor, a multi-core processor, a computing cluster, or any number of other configurations. The processor 902 may be connected through a bus 930 to one or more input and output devices.

In some embodiments, the instructions for the image reconstruction may be stored in a memory 904. The memory 904 can include random access memory (RAM), read only memory (ROM), flash memory, or any other suitable memory systems. In some example embodiments, the instructions may include instructions for executing the incremental frequency inversion framework 500. The instructions may also include a trained deep learning module for determining a preconditioner of the frequency inverse problem and the frequency components for the incremental frequency inversion framework 500.

The tomographic imaging system 900 may include a number of interfaces for connecting with other systems and devices. For instance, the tomographic imaging system 900 includes a network interface controller (NIC) 924. The NIC 924 is adapted to connect the tomographic imaging system 900 to a network 920 via the bus 930 for connecting the tomographic imaging system 900 with sensing devices. For example, the tomographic imaging system 900 includes a transmitter interface 908 configured to command to a transmitter 910 to transmit an incident wavefield, such as the incident wavefield 304. Using a receiver interface 916 connected to a receiver 918, the tomographic imaging system 900 may receive scattered wavefield, such as the scattered wavefield 306 corresponding to the transmitted incident wavefield 304. In some implementations, the tomographic imaging system 900 receives measurement of total wavefield 932 about the incident wavefield 304 and the scattered wavefield 306 via the network 920.

The tomographic imaging system 900 also includes an output interface 912 configured to output the reconstructed image 702. For example, the output interface 912 may display the reconstructed image 702 on a display device, store the image 702 into storage medium and/or transmit the image 702 over the network 920. For example, the tomographic imaging system 900 may be linked through the bus 930 to a display interface adapted to connect the tomographic imaging system 900 to an output device 914. The output device 914 may include, but not limited to, a computer monitor, a camera, a television, a projector, a mobile device, a tablet, a phablet, or the like. The tomographic imaging system 900 may also be connected to an application interface adapted to connect the tomographic imaging system 900 with equipment for performing various tasks.

In some implementations, the tomographic imaging system 900 includes an input interface to receive measurements at frequencies (e.g., the indexed frequency components ranging from 10 MHz to 50 MHz) of a wavefield scattered (e.g., the scattered wavefield 306) by an internal structure of the object 102. Examples of the input interface include NIC 924, the receiver interface 916, and a human machine interface (HMI) 922. The human machine interface 922 within the tomographic imaging system 900 connects with a keyboard 926 and a pointing device 928. The pointing device 928 can include a mouse, trackball, touchpad, joystick, pointing stick, stylus, or touchscreen, among others.

Figure 10:
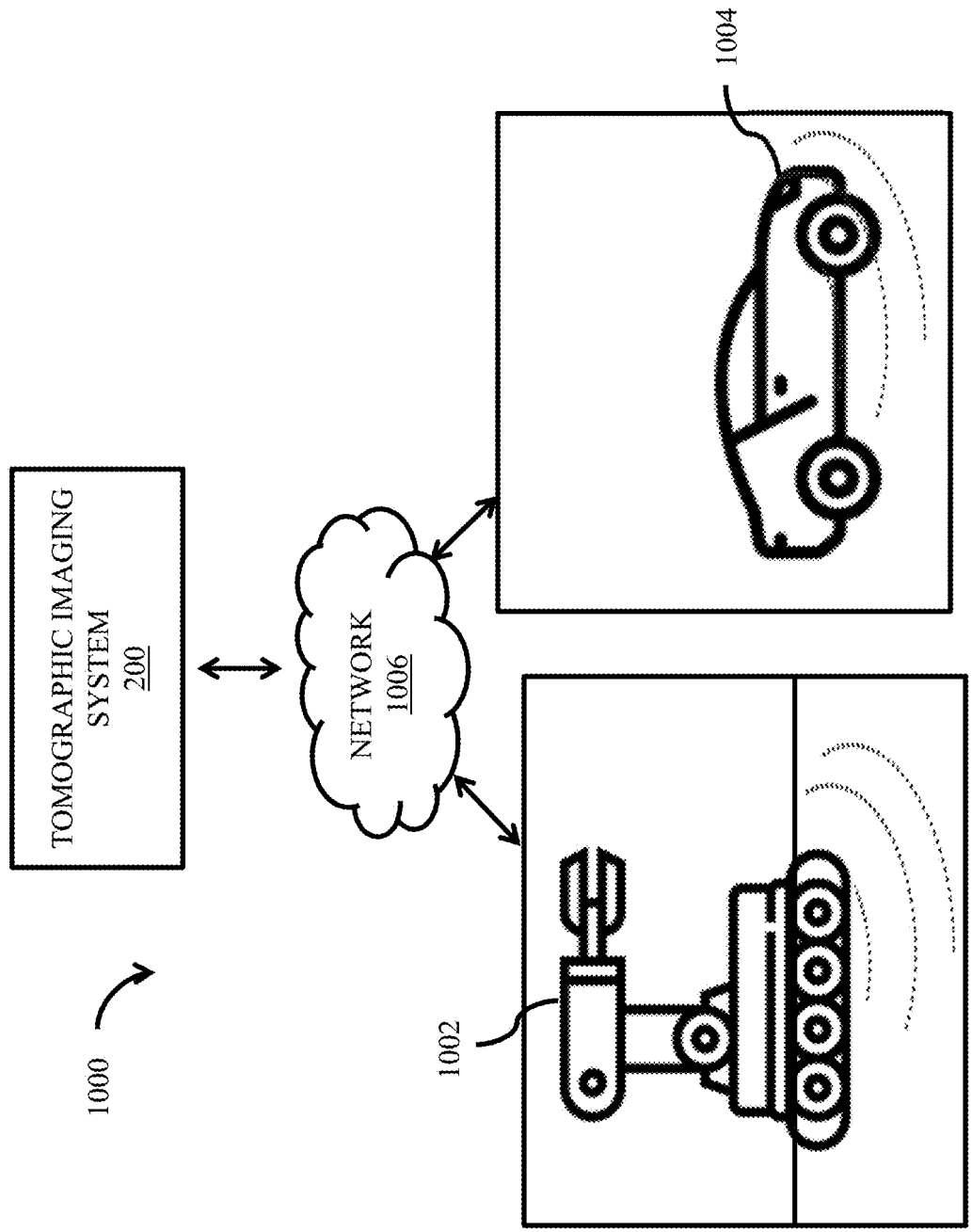
FIG. 10 shows a use case for implementation of the tomographic imaging system, according to some embodiments of the present disclosure.

FIG. 10 shows a use case 1000 for implementation of the tomographic imaging system 900, according to some embodiments of the present disclosure. In one example scenario, the tomographic imaging system 900 may be used for underground or subsurface imaging by a remote sensing device 1002. The remote sensing device 1002 may hover over a region of interest on a ground for the imaging. The remote sensing device 1002 may include transceivers or sensors to transmit waves (e.g., electromagnetic waves) that propagate through the ground. The transmitted waves may interact with an object buried in the ground. The object may include a pipeline, a structural beam, a wireline, or the like that may scatter the transmitted waves from the sensors of the remote sensing device 1002. These scattered waves are received by the remote sensing device 1002 via the sensors. The remote sensing device 1002 may further send the scattered waves to the tomographic imaging system 900 via a network 1006. The network 1006 is an example of the network 920. The tomographic imaging system 900 processes the scattered waves and the transmitted waves to return an accurate reconstructed image of an internal structure of the buried object that visualizes an internal structure of the buried object.

The reconstructed image is accurate as the tomographic imaging system 900 synthesizes a background wavefield for the image reconstruction by solving an optimization problem with free space boundary conditions, which incorporates knowledge corresponding to parameters, such as reflectivity, permittivity, or the like of the ground. Moreover, the tomographic imaging system 900 reconstructs the image in an iterative manner, which results in outputting the accurate reconstructed image of the internal structure of the buried object. The tomographic imaging system 900 also returns the reconstructed image in a feasible amount of time as the image is reconstructed in a reconstruction domain (i.e., the computational domain 310) that is reduced in size than actual background space in the ground.

In some cases, there may be suspected object buried in the ground. For instance, the buried object may include an explosive object. Such explosive object may be detected by the remote sensing device 1002 using the tomographic imaging system 900.

Likewise, in another example scenario, the tomographic imaging system 900 may be implemented in a vehicle navigation application. A vehicle 1004 may correspond to an autonomous vehicle, a semi-autonomous vehicle or a manually operated vehicle that may. The vehicle 1004 may be driven on a road in a hazardous weather conditions, such as foggy condition, stormy condition, rainy condition, or the like. The vehicle 1004 may face difficulty to navigate the road as visibility of the road may be affected due to the hazardous weather conditions. In such scenario, chances of experiencing unwanted situations by the vehicle 1004 may be high. For instance, the vehicle 1004 may collide with another vehicle, fall on a pothole, or the like. To that end, the vehicle 1004 may be assisted with the tomographic imaging system 900 for detecting obstacles, such as other vehicle on the same road, potholes present on the road, or the like in the road navigation during the hazardous weather conditions. In some example embodiments, the tomographic imaging system 900 may be embodied within the vehicle 1004. In some other example embodiments, the tomographic imaging system 900 may be remotely connected with the vehicle 1004 via the network 1006. The vehicle 1004 may transmit the waves using sensors of the vehicle 1006. The sensors receive back the scattered waves from the road as well as the obstacles. The transmitted waves and the scattered waves are processed by the tomographic imaging system 900 to render a reconstructed image corresponding to the obstacles. The reconstructed image may be sent to an object detection device of the vehicle 1004. The object detection device of the vehicle 1004 may process the image and return a command to alert an operator of the vehicle 1004. For instance, the command may be a voice command, or a textual command, such as "POTHOLE DETECTED" to alert a driver or a passenger in the vehicle 1004.

The tomographic imaging system 900 may also be implemented in medical diagnosis application, cell study application, or the like. One use case for such application is described next FIG. 11.

Figure 11:
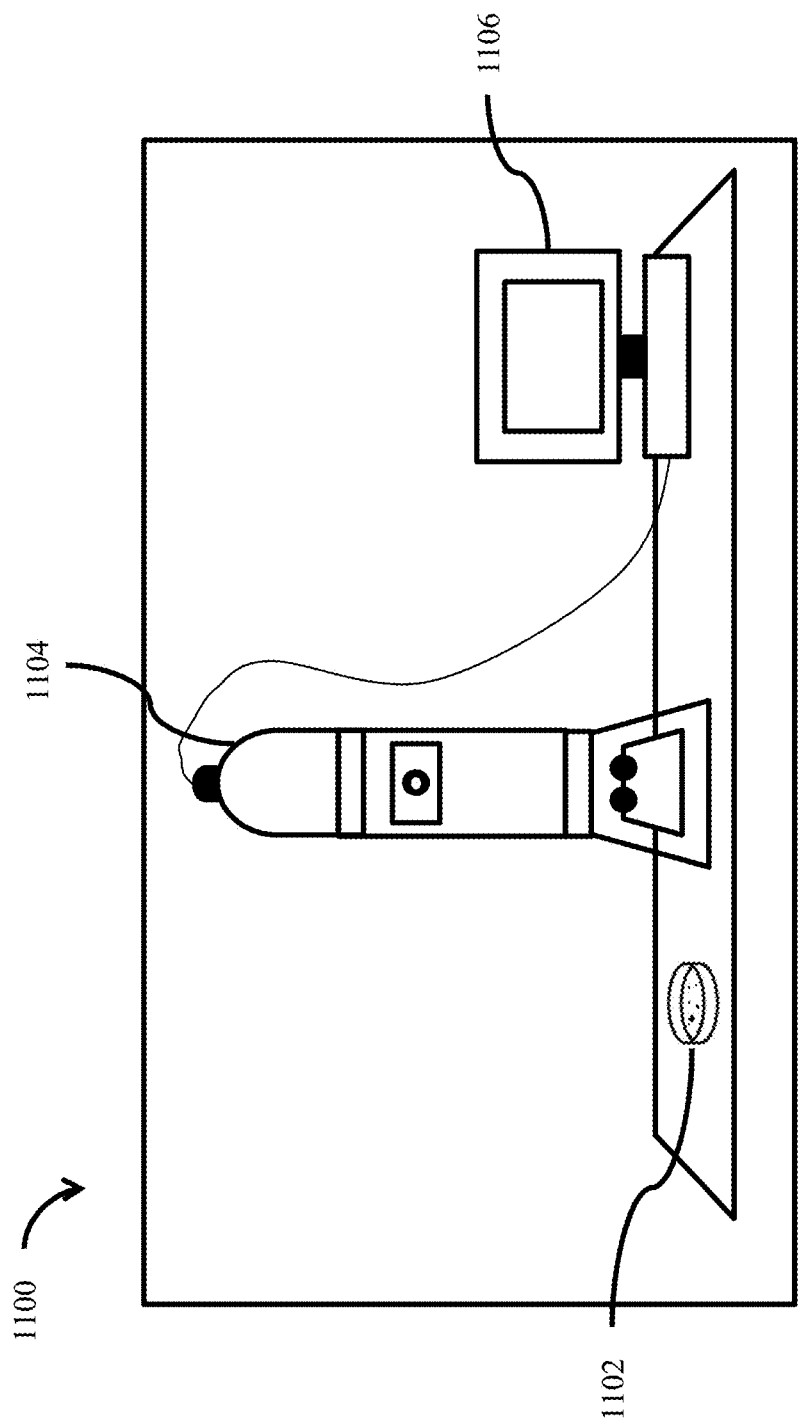
FIG. 11 shows a use case for implementation of the tomographic imaging system, according to some other embodiments of the present disclosure.

FIG. 11 shows a use case 1100 for implementation of the tomographic imaging system 900, according to some embodiments of the present disclosure. In the use case 1100, the tomographic imaging system 900 is used for reconstruction of an image of a cell submerged in a fluid that is contained in a cell culture dish 1102. The tomographic imaging system 900 may be embodied in an electronic microscope 1104. Alternatively, the tomographic imaging system 900 may be connected with the electronic microscope 1104 via a network, such as the network 920. The electronic device 1104 may emit electromagnetic waves or pulses to the cell culture dish 1102. The fluid and the submerged cell in the cell culture dish 1102 may scatter the emitted electromagnetic waves. The scattered electromagnetic waves and the emitted electromagnetic waves are processed by the tomographic imaging system 900 to render a reconstructed image of the cell. The reconstructed image may be displayed on a device 1106.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the disclosure has been described by way of examples of preferred embodiments, it is to be understood that various other adaptations and modifications can be made within the spirit and scope of the disclosure. Therefore, it is the object of the appended claims to cover all such variations and modifications as come within the true spirit and scope of the disclosure.

We claim:

1. A tomographic imaging system for reconstructing an image of an internal structure of an object, comprising
    a transmitter configured to transmit an incident wavefield to an object, the object being embedded in an inhomogeneous reflectivity background medium with a known internal structure and the object occupying a background domain in the inhomogeneous reflectivity background medium;
    a receiver configured to receive measurements of a total wavefield, wherein the total wavefield is a combination of the incident wavefield and a wavefield scattered by an unknown internal structure of the object and the known internal structure of the background domain, and wherein the object occupies a computational domain that is smaller than the background domain residing inside the inhomogeneous reflectivity background medium;
    a memory configured to store a cross-domain operator and a residual measurement operator, wherein the cross-domain operator defines a propagation of the total wavefield from the computational domain of the object having the unknown internal structure of the object into a residual domain and back into the computational domain, wherein the residual domain occupies a portion of the background domain located outside the computational domain, and wherein the residual measurement operator defines a propagation of the total wavefield from the computational domain into the residual domain and back to the receiver;
    a processor configured to reconstruct an image of the unknown internal structure of the object from the measurements by solving an optimization problem corresponding to the computational domain of the object subject to boundary conditions of the stored cross-domain and residual measurement operators, wherein the optimization problem is solved iteratively to minimize a difference between the measurements of the total wavefield and a wavefield synthesized using a measurement operator and a Green's function operator from the reconstructed image; and
    an output interface configured to render the reconstructed image.

2. The tomographic imaging system of claim 1, wherein the background domain is configured to decay the wavefield propagated between the transmitter and the receiver through the background domain, such that the measurements of the total wavefield from the propagation of the total wavefield outside of the background domain are not affected.

3. The tomographic imaging system of claim 1, wherein the cross-domain operator comprises a mapping function for the total wavefield in the computational domain, wherein the mapping function comprises a mapping from each grid point in the computational domain to each corresponding grid point in the residual domain, to perform a series of integration operations, comprising:
    a first operation to perform, for each grid point in the residual domain, an integral with a Green's function centered at a grid point in the residual domain over each grid point in the computational domain;
    a second operation to compute an updated total wavefield resulting from an interaction of the total wavefield in the residual domain with the background medium inside the residual domain; and
    a third operation to perform, for each grid point in the computational domain, an integral with a Green's function centered at a grid point in the computational domain over each grid point in the residual domain.

4. The tomographic imaging system of claim 1, wherein the residual measurement operator comprises a mapping function for the total wavefield in the computational domain, wherein the mapping function comprises a mapping from each grid point in the computational domain to each location of a corresponding array of antennas of the receiver, to perform a series of integration operations, comprising:
    a first operation to perform, for each grid point in the residual domain, an integral with a Green's function centered at the grid point in the residual domain over each grid point in the computational domain;
    a second operation to compute an updated total wavefield resulting from an interaction of the total wavefield in the residual domain with the background medium inside the residual domain; and
    a third operation to perform, for the location of the corresponding array of antennas of the receiver, an integral with a Green's function centered at the location of the corresponding array of antennas over each grid point in the residual domain.

5. The tomographic imaging system of claim 1, wherein the optimization problem for the computational domain subject to the boundary conditions governed by the stored cross-domain and residual measurement operators is converted to another optimization problem having free space boundary conditions that is solved to reconstruct the image of the unknown internal structure of the object, and wherein the conversion further comprises:
    synthesizing a background wavefield at each grid point in the background domain and measurements of the background wavefield at the receiver, resulting from a propagation of the incident wavefield into the background domain with the known internal structure of the inhomogeneous reflectivity background medium; and
    computing simultaneously a difference wavefield along with the unknown internal structure of the object by forming a difference partial differential equation (PDE) operator that discretizes a PDE describing an interaction between the cross-domain operator, the residual measurement operator, the measurement operator, the Green's function operator, the incident wavefield, the background wavefield, the difference wavefield, and the unknown internal structure of the object.

6. The tomographic imaging system of claim 5, wherein the optimization problem that is solved to reconstruct the image of the unknown internal structure of the object, further comprises:

an inversion operation inverting the PDE operator for an initialized current image of the internal structure of the object to determine a Jacobian of the scattered wavefield with respect to the current image of the internal structure of the object;

an update operation updating the current image of the internal structure of the object by minimizing a cost function between the measurements of the total wavefield and a total wavefield synthesized by combining the Jacobian of the scattered wavefield and a quasi-Newton descent direction of the cost function with respect to the image of the internal structure of the object; and project the current image of the internal structure of the object onto a constrained total variation penalty function.

7. The tomographic imaging system of claim 6, wherein the cost function between the measurements of the total wavefield and the synthesized total wavefield comprises one or a combination of:

a Euclidean distance between the measurements of the total measurements of the total wavefield and the synthesized total wavefield;

a one norm distance between the measurements of the total wavefield and the synthesized total wavefield; and a summation of the Euclidean distance and a barrier function, wherein the barrier function is a summation of an exponential function penalizing the update of the current image of the internal structure of the object.

8. The tomographic imaging system of claim 6, wherein the inversion operation inverting the PDE operator is performed using a preconditioned conjugate gradient method, and wherein a preconditioner of the PDE operator is computed using a deep learning network, wherein the deep learning network is trained to determine an estimate of the scattered wavefield from the incident wavefield for the reconstructed image.

9. The tomographic imaging system of claim 1, wherein the reconstructed image is an image of refractive indices of the material inside the object.

10. The tomographic imaging system of claim 1, wherein the reconstructed image includes distribution of permittivity of the material inside the object.

11. A tomographic imaging method for reconstructing an image of an internal structure of an object, wherein the method uses a processor coupled with stored instructions for implementing the method, wherein the instructions, when executed by the processor conduct steps of the method, comprising:

transmitting an incident wavefield into an object embedded in an inhomogeneous reflectivity background medium with a known internal structure and the object occupying a background domain in the inhomogeneous reflectivity background medium;

receiving measurements of a total wavefield, wherein the total wavefield is a combination of the incident wavefield and a wavefield scattered by an unknown internal structure of the object and the known internal structure of the background domain, and wherein the object occupies a computational domain that is smaller than the background domain residing inside the inhomogeneous reflectivity background medium;

reconstructing an image of the unknown internal structure of the object from the measurements by solving an optimization problem corresponding to the computational domain of the object subject to boundary conditions of stored cross-domain and residual measurement operators, wherein the optimization problem is solved iteratively to minimize a difference between the measurements of the total wavefield and a wavefield synthesized using a measurement operator and a Green's function operator from the reconstructed image; and generating, via an output interface, the reconstructed image.

12. The tomographic imaging method of claim 11, wherein the background domain is configured to decay the wavefield propagated between the transmitter and the receiver through the background domain, such that the measurements from the propagation of the wavefield outside of the background domain are not affected.

13. The tomographic imaging method of claim 11, further comprising performing a mapping function using a cross-domain operator for mapping the total wavefield in the computational domain from each grid point in the computational domain to each corresponding grid point in the residual domain, wherein the mapping function performs a series of integration operations, comprising:

a first operation performing, for each grid point in the residual domain, an integral with a Green's function centered at a grid point in the residual domain over each grid point in the computational domain;

a second operation computing an updated total wavefield resulting from an interaction of the total wavefield in the residual domain with the background medium inside the residual domain; and a third operation performing, for each grid point in the computational domain, an integral with a Green's function centered at a grid point in the computational domain over each grid point in the residual domain.

14. The tomographic imaging method of claim 11, further comprising performing a mapping function, using a residual measurement operator for mapping the total wavefield in the computational domain from each grid point in the computational domain to each location of a corresponding array of antennas of the receiver, wherein the mapping function performs a series of integration operations, comprising:

a first operation performing, for each grid point in the residual domain, an integral with a Green's function centered at the grid point in the residual domain over each grid point in the computational domain;

a second operation computing an updated total wavefield resulting from an interaction of the total wavefield in the residual domain with the background medium inside the residual domain; and a third operation performing, for the location of the corresponding an array of antennas of the receiver, an integral with a Green's function centered at the location of the corresponding an array of antennas over each grid point in the residual domain.

15. The tomographic imaging method of claim 11, wherein the optimization problem for the computational domain subject to the boundary conditions governed by the stored cross-domain and residual measurement operators is converted to another optimization problem having free space boundary conditions that is solved to reconstruct the image of the unknown internal structure of the object, and wherein the conversion further comprises:

synthesizing a background wavefield at each grid point in the background domain and measurements of the background wavefield at the receiver, resulting from a propagation of the incident wavefield into the background domain with the known internal structure of the inhomogeneous reflectivity background medium; and computing simultaneously a difference wavefield along with the unknown internal structure of the object by forming a difference partial differential equation (PDE) operator that discretizes a PDE describing an interaction between the cross-domain operator, the residual measurement operator, the measurement operator, the Green's function operator, the incident wavefield, the background wavefield, the difference wavefield, and the unknown internal structure of the object.

16. The tomographic imaging method of claim 15, wherein the solving of the optimization problem, further comprises:
   inverting the PDE operator for an initialized current image of the internal structure of the object to determine a Jacobian of the scattered wavefield with respect to the current image of the internal structure of the object;
   updating the current image of the internal structure of the object by minimizing a cost function between the measurements of the total wavefield and a total wavefield synthesized by combining the Jacobian of the scattered wavefield and a quasi-Newton descent direction of the cost function with respect to the image of the internal structure of the object; and
   projecting the current image of the internal structure of the object onto a constrained total variation penalty function.

17. The tomographic imaging method of claim 16, wherein the cost function between the measured wavefield and the synthesized total wavefield comprises one or a combination of:
   a Euclidean distance between the measurements of the total measurements of the total wavefield and the synthesized total wavefield;
   a one norm distance between the measurements of the total wavefield and the synthesized total wavefield; and
   a summation of the Euclidean distance and a barrier function, wherein the barrier function is a summation of an exponential function penalizing the update of the current image of the internal structure of the object.

18. The tomographic imaging method of claim 16, wherein the inverting of the PDE operator is performed using a preconditioned conjugate gradient method, and wherein: a preconditioner of the PDE operator is computed using a deep learning network, wherein the deep learning network is trained to determine an estimate of the scattered wavefield from an input wavefield corresponding to the probing pulse and for the reconstructed image.

19. A non-transitory computer readable storage medium embodied thereon a program executable by a processor for reconstructing an image of an internal structure of an object, the method comprising:
   transmitting an incident wavefield into an object embedded in an inhomogeneous reflectivity background medium with a known internal structure and the object occupying a background domain in the inhomogeneous reflectivity background medium;
   receiving measurements of a total wavefield, wherein the total wavefield is a combination of the incident wavefield and a wavefield scattered by an unknown internal structure of the object and the known internal structure of the background domain, and wherein the object occupies a computational domain that is smaller than the background domain residing inside the inhomogeneous reflectivity background medium;
   reconstructing an image of the unknown internal structure of the object from the measurements by solving an optimization problem corresponding to the computational domain of the object subject to boundary conditions of the stored cross-domain and residual measurement operators, wherein the optimization problem is solved iteratively to minimize a difference between the measurements of the total wavefield and a wavefield synthesized using a measurement operator and a Green's function operator from the reconstructed image; and
   generating, via an output interface, the reconstructed image.

20. The non-transitory computer readable storage medium of claim 19, wherein the background domain is configured to decay the wavefield propagated between the transmitter and the receiver through the background domain, such that the measurements from the propagation of the wavefield outside of the background domain are not affected.

\* \* \* \* \*